(12) United States Patent
Dacosta et al.

(10) Patent No.: US 12,458,366 B2
(45) Date of Patent: Nov. 4, 2025

(54) TIBIAL OSTEOTOMY SYSTEM, INSTRUMENTS, AND RELATED METHODS

(71) Applicant: Paragon 28, Inc., Englewood, CO (US)

(72) Inventors: Albert Dacosta, Lone Tree, CO (US); Laura Zagrocki Brinker, Lone Tree, CO (US); Richard David Hunt, Arvada, CO (US); Dirk C. Bernhardt, Scottsdale, AZ (US); Kareen A. Fajardo Cortes, Tucson, AZ (US); Joshua A. McLean, Tucson, AZ (US); Andrew A. Okonya, Oro Valley, AZ (US); Melissa R. Requist, Steamboat Springs, CO (US)

(73) Assignee: Paragon 28, Inc., Englewood, CO (US)

( * ) Notice: Subject to any disclaimer, the term of this patent is extended or adjusted under 35 U.S.C. 154(b) by 265 days.

(21) Appl. No.: 18/047,130

(22) Filed: Oct. 17, 2022

(65) Prior Publication Data

US 2023/0060889 A1    Mar. 2, 2023

Related U.S. Application Data

(63) Continuation of application No. PCT/US2021/027723, filed on Apr. 16, 2021.
(Continued)

(51) Int. Cl.
*A61B 17/17*     (2006.01)
*A61B 17/15*     (2006.01)

(52) U.S. Cl.
CPC ........ *A61B 17/157* (2013.01); *A61B 17/1775* (2016.11)

(58) Field of Classification Search
CPC .. A61B 17/1775; A61B 17/151; A61B 17/157
See application file for complete search history.

(56) References Cited

U.S. PATENT DOCUMENTS 4,627,425 A    12/1986  Reese
5,364,402 A    11/1994  Mumme
(Continued)

FOREIGN PATENT DOCUMENTS

AU    2015308660    3/2017
KR    20180078484    7/2018
KR    101900163     9/2018

OTHER PUBLICATIONS

Supplementary European Search Report for EP4135601 (Application No. 21788705.8) [online], Apr. 3, 2024, 2 pages [retrieved on Feb. 26, 2025]. Retrieved from Patentscope: <https://patentscope.wipo.int/search/en/detail.jsf?docId=EP392328763&_cid=P11-M7MEE1-43390-1> (Year: 2024).*

(Continued)

*Primary Examiner* — Christian A Sevilla
(74) *Attorney, Agent, or Firm* — Heslin Rothenberg Farley & Mesiti P.C.; Jacquelyn A. Graff, Esq.

(57) ABSTRACT

The present disclosure relates to a tibial osteotomy system. The system includes a base plate configured to interface with the tibia which includes a body with a first pair of apertures configured to receive a first pair of stabilization elements, a first end with a first aperture, and a second end with a second aperture. The system also includes a measuring arm coupled with the first end of the base plate via the first aperture and having a third aperture aligned with the first aperture to receive a first screw, and a cut guide pivotably coupled with the second end of the base plate via the second aperture and having a fourth aperture aligned with the second aperture to receive a second screw therein. The cut guide also has a slot, a measurement flag releasably couplable within the slot, and a protrusion configured to receive a second stabilization element.

18 Claims, 23 Drawing Sheets

Related U.S. Application Data

(60) Provisional application No. 63/011,737, filed on Apr. 17, 2020.

(56) References Cited

U.S. PATENT DOCUMENTS

| | | | |
|---|---|---|---|
| 5,484,446 | A | 1/1996 | Burke |
| 8,241,292 | B2 | 8/2012 | Collazo |
| 2002/0165552 | A1 | 11/2002 | Duffner |
| 2005/0154394 | A1 | 7/2005 | Michalowicz |
| 2005/0273112 | A1 | 12/2005 | McNamara |
| 2008/0015607 | A1* | 1/2008 | D'Alessio ............ A61F 2/4684 606/87 |
| 2009/0318924 | A1* | 12/2009 | Helenbolt ............ A61B 17/151 606/88 |
| 2010/0191243 | A1* | 7/2010 | Horan .................... A61B 17/15 606/87 |
| 2017/0049462 | A1* | 2/2017 | Walton ............... A61B 17/1764 |
| 2018/0146970 | A1* | 5/2018 | Luna .................. A61B 17/846 |
| 2020/0113581 | A1 | 4/2020 | Duerr |

OTHER PUBLICATIONS

Examination report for AU2021257263 [online], Oct. 27, 2023, 5 pages [retrieved on Feb. 26, 2025]. Retrieved from IP Australia: <https://ipsearch.ipaustralia.gov.au/patents/2021257263> (Year: 2023).*
International Search Report and Written Opinion of the International Searching Authority for PCT/US2021/027723, Aug. 13, 2021, 9 pages.

\* cited by examiner

TIBIAL OSTEOTOMY SYSTEM, INSTRUMENTS, AND RELATED METHODS

CROSS REFERENCE TO RELATED APPLICATION

This application is a continuation of PCT Application No. PCT/US2021/027723, filed Apr. 16, 2021, and entitled "Tibial Osteotomy System, Instruments, and Related Methods," which claims priority benefit under 35 U.S.C. § 119(e) of U.S. provisional application No. 63/011,737, filed Apr. 17, 2020, and entitled "Tibial Osteotomy System, Instruments, and Related Methods," which are incorporated herein by reference in their entireties.

TECHNICAL FIELD

The present disclosure relates to bone and soft tissue systems, instruments, and related methods. The present disclosure relates to podiatric and orthopedic bone and soft tissue systems, instruments, and associated surgical procedures to repair and/or correct soft tissue and/or bone. More specifically, but not exclusively, the present disclosure relates to instruments, systems, assemblies, and methods for repairing and/or correcting soft tissue and/or bone, for example a bone deformity in the distal tibia.

BACKGROUND

Deformities of or near the ankle joint can be caused by a variety of conditions and incidents, for example improperly healed fractures or osteoarthritis. Accordingly, a device may be implanted in the tibia, for example a bone wedge, in order to realign the anatomical and mechanical axes of the ankle joint. Similarly, in some procedures an implant may also be removed from the tibia. Both uniplanar (sagittal plane deformity) and biplanar (sagittal and frontal plane deformities) deformities may be corrected using the tibial osteotomy procedure.

Typically, a tibial osteotomy (and more specifically a distal tibial osteotomy) is performed by making a series of cuts by hand using visual planning (which is commonly done preoperatively using X-rays, as well as with stabilizing elements and fluoroscopy techniques operatively) rather than guided and measured cutting and planning. Accordingly, tibial osteotomy procedures have a high incidence of error associate with the procedure and specifically the cuts, as such a procedure requires a high level of surgeon experience and expertise, as well as execution. Specifically, in biplanar correction, tibial osteotomies are challenging for surgeons to perform and are therefore often have limited accessibility to patients in need.

Accordingly, a surgical device is desired to provide guidance for both uniplanar and biplanar tibial osteotomies in order to allow for greater surgeon accuracy as well as increased repeatability of the procedure.

Thus, there is a need for instruments, implants, systems, assemblies, and methods for tibial osteotomy and other parts of a mammalian (e.g., human) body, that are measurable and facilitate precise surgical procedures with high repeatability.

The present disclosure is directed to overcoming these and other deficiencies in the art.

SUMMARY OF THE INVENTION

A first aspect relates to a tibial osteotomy system. The system includes a base plate with a first end and a second end, a measuring arm coupled with and extending from the first end of the base plate, and a cut guide coupled with and extending from the second end of the base plate, wherein the cut guide is translatable relative to the base plate and the measuring arm.

In one embodiment, the measuring arm includes a curved geometry. In one embodiment, the measuring arm includes a head portion with an aperture configured to fixedly couple with the first end of the base plate, and an arm portion extending from the head portion having a guide portion.

In one embodiment, the cut guide is pivotable coupled with the second end of the base plate. In one embodiment, the cut guide includes a head portion with an aperture configured to pivotable couple with the second end of the base plate, and a body extending from the head portion having a first arm and a second arm, wherein the first arm and the second arm define a slot. In one embodiment, the cut guide includes a measurement flag releasably couplable with the slot such that pivoting of the cut guide relative to the measuring arm positions the measurement flag adjacent to the guide portion of the measuring arm. In one embodiment, the slot is configured to accommodate a blade of a cutting tool. In one embodiment, the cut guide includes a protrusion extending from the body of the cut guide and comprising at least one aperture, wherein the aperture of the protrusion is configured to receive a stabilization element.

In one embodiment, the base plate includes a body portion disposed between the first end and the second end, wherein the bottom surface of the base plate is configured to interface with the anterior surface of a tibia. In one embodiment, the body of the base plate includes a pair of apertures configured to receive a pair of stabilization elements, wherein the stabilization elements couple the base plate with the tibia.

In one embodiment, the measurement arm is coupled with the first end of the base plate by a first screw and the cut guide is coupled with the second end of the base plate by a second screw. In one embodiment, the first and second screws are the same. In one embodiment, the first and second screws include a bore extending through the screws along a central axis, the bore configured to receive a stabilization element.

A second aspect relates to a tibial osteotomy system. The system includes a base plate configured to interface with the tibia. The base plate includes a body with a first pair of apertures configured to receive a first pair of stabilization elements, a first end with a first aperture, and a second end with a second aperture, where the first end is arranged opposite the body from the second end. The system also includes a measuring arm fixedly coupled with the first end of the base plate via the first aperture and having a third aperture, wherein the third aperture and the first aperture align to receive a first screw therein. The system also includes a cut guide pivotably coupled with the second end of the base plate via the second aperture and a fourth aperture, the fourth aperture and second aperture aligned to receive a second screw therein, wherein the cut guide includes a slot, a measurement flag releasable couplable within the slot, and a protrusion comprising a fifth aperture configured to receive a second stabilization element therethrough.

In one embodiment, the first screw and the second screw each have a bore configured concentrically about a central axis, the bores configured to receive a second pair of stabilization elements. In one embodiment, the second pair of stabilization elements are K-wires. In one embodiment, the first pair of stabilization elements are olive wires. In one embodiment, the measuring arm includes a guide portion with incremental measurement markings. In one embodiment, the measurement flag is coupled within the slot such that pivoting the cut guide positions the measurement flag adjacent to the incremental measurement markings.

A third aspect relates to a method of preparing a tibia for a tibial osteotomy. The method includes providing a tibial osteotomy system including a base plate, a measuring arm fixedly coupled with the base plate, and a cut guide pivotable coupled with the base plate and including a measurement flag releasably coupled within a slot. The method further includes coupling the base plate with the tibia, pivoting the cut guide such that the measurement flag is positioned adjacent the measuring arm, removing the measuring flag from the slot, and positioning a cutting tool such that a blade of the cutting tool is disposed within the slot of the cutting guide and adjacent to the tibia.

These and other objects, features, and advantages of the aspects disclosed herein will become apparent from the following detailed description of the various aspects of the invention taken in conjunction with the accompanying drawings.

BRIEF DESCRIPTION OF THE DRAWINGS

The accompanying drawings, which are incorporated in and constitute a part of the specification, illustrate embodiments of the inventions and together with the detailed description herein, serve to explain the principles of the inventions. It is emphasized that, in accordance with the standard practice in the industry, various features may or may not be drawn to scale. In fact, the dimensions of the various features may be arbitrarily increased or reduced for clarity of discussion. The drawings are only for purposes of illustrating embodiments of inventions of the disclosure and are not to be construed as limiting the inventions.

DETAILED DESCRIPTION FOR CARRYING OUT THE INVENTION

Figure 1:
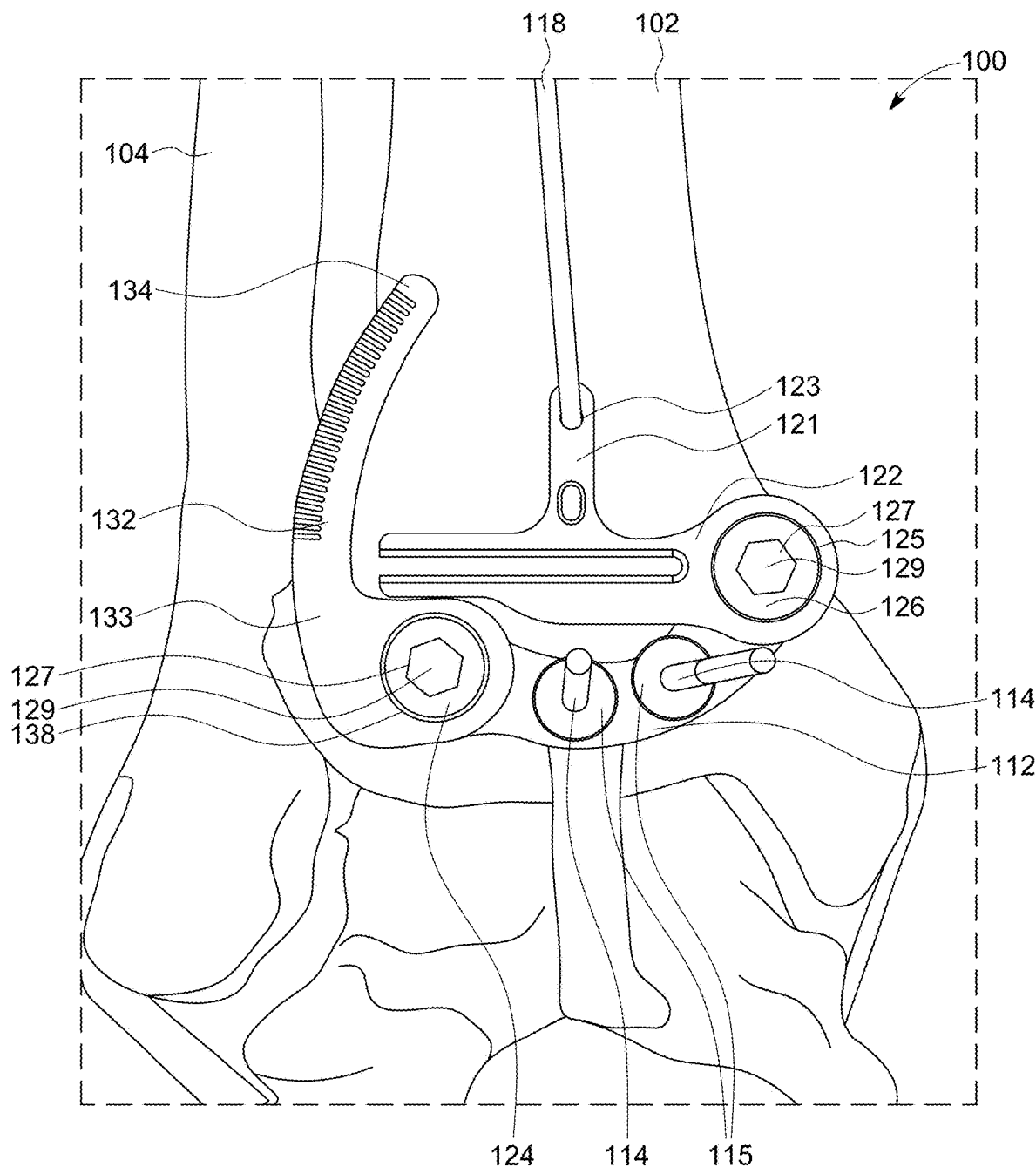
FIG. 1 is a front view of an exemplary tibial osteotomy system positioned at the distal portion of the tibia, in accordance with an aspect of the present disclosure.

In this detailed description and the following claims, the words proximal, distal, anterior or plantar, posterior or dorsal, medial, lateral, superior and inferior are defined by their standard usage for indicating a particular part or portion of a bone or implant according to the relative disposition of the natural bone or directional terms of reference. For example, "proximal" means the portion of a device or implant nearest the torso, while "distal" indicates the portion of the device or implant farthest from the torso. As for directional terms, "anterior" is a direction towards the front side of the body, "posterior" means a direction towards the back side of the body, "medial" means towards the midline of the body, "lateral" is a direction towards the sides or away from the midline of the body, "superior" means a direction above and "inferior" means a direction below another object or structure. Further, specifically in regards to the foot, the term "dorsal" refers to the top of the foot and the term "plantar" refers the bottom of the foot.

Similarly, positions or directions may be used herein with reference to anatomical structures or surfaces. For example, as the current implants, devices, instrumentation, and methods are described herein with reference to use with the bones of the foot, the bones of the foot, ankle and lower leg may be used to describe the surfaces, positions, directions or orientations of the implants, devices, instrumentation and methods. Further, the implants, devices, instrumentation, and methods, and the aspects, components, features and the like thereof, disclosed herein are described with respect to one side of the body for brevity purposes. However, as the human body is relatively symmetrical or mirrored about a line of symmetry (midline), it is hereby expressly contemplated that the implants, devices, instrumentation, and methods, and the aspects, components, features and the like thereof, described and/or illustrated herein may be changed, varied, modified, reconfigured or otherwise altered for use or association with another side of the body for a same or similar purpose without departing from the spirit and scope of the invention. For example, the implants, devices, instrumentation, and methods, and the aspects, components, features and the like thereof, described herein with respect to the right foot may be mirrored so that they likewise function with the left foot. Further, the implants, devices, instrumentation, and methods, and the aspects, components, features and the like thereof, disclosed herein are described with respect to the foot for brevity purposes, but it should be understood that the implants, devices, instrumentation, and methods may be used with other bones of the body having similar structures.

Generally stated, disclosed herein are instruments, components, systems, assemblies, and methods for correcting and/or repairing soft tissue and/or bone. The instruments, components, systems, assemblies and methods disclosed herein may be used for performing a tibial osteotomy. In some applications, the instruments, components, systems, assemblies and methods disclosed herein may be implemented in performing a tibial osteotomy on the distal portion of the tibia (referred to herein as a distal tibial osteotomy). While the instruments, components, systems, assemblies, and methods may be illustrated and described in the present disclosure in the context of distal tibial osteotomy, the instruments, components, systems, assemblies, and methods may equally be employed or may be adapted without undue experimentation to perform other procedures, for example tibial osteotomy on alternate portions of the tibia. Further, the instruments, components, systems, assemblies, and methods may be equally employed to correct and/or repair any other tissue and/or bone segments or portions of the foot or other parts of the mammalian (e.g., human) body, such as but not limited to musculoskeletal components of the foot and ankle joint.

Referring to the drawings, wherein like reference numerals are used to indicate like or analogous components throughout the several views, and with particular reference to FIGS. 1-18, there is illustrated an exemplary embodiment of a tibial osteotomy system 100 for correcting and/or repairing a portion of the tibia (or other bone and/or soft tissue) in a tibial osteotomy procedure. In FIGS. 19-27, there are alternate exemplary embodiments of tibial osteotomy systems for correcting and/or repairing a portion of the tibia (or other bone and/or soft tissue) in a tibial osteotomy procedure, according to the present disclosure.

Referring to FIGS. 1-18, a tibial osteotomy system, guide, device, or instrument is shown as osteotomy system 100. In some embodiments, the tibial osteotomy system 100 may be implemented in order to facilitate an osteotomy or other procedure on the tibia and/or surrounding bone and/or soft tissue, for example musculoskeletal components of the foot and/or ankle. The osteotomy system 100, as shown in FIGS. 1, 3, and 13-18, is positioned on a distal portion of a tibia 102 (where the tibia 102 is adjacent a fibula 104). The osteotomy system 100 is configured to facilitate a tibial osteotomy procedure which, for the sake of brevity, will be referred to as a distal tibial osteotomy herein. However, in some applications the osteotomy system 100 may be implemented in facilitating a tibial osteotomy on portions of the tibia 102 other than the distal portion of the tibia 102. In a distal tibial osteotomy, the osteotomy guide 100 is configured to be coupled with the tibia 102 of a patient in order to secure the osteotomy system 100 and prevent shifting or other movement of the osteotomy system 100 relative to the distal portion of the tibia 102. In the distal tibial osteotomy procedure, the osteotomy system 100 facilitates alignment of the tibia 102 such that one or more surgeons may make necessary cuts in the tibia 102 and/or otherwise manipulate the tibia 102, the fibula 104, or other parts of the foot and/or ankle in order to facilitate the distal tibial osteotomy.

Figure 2:
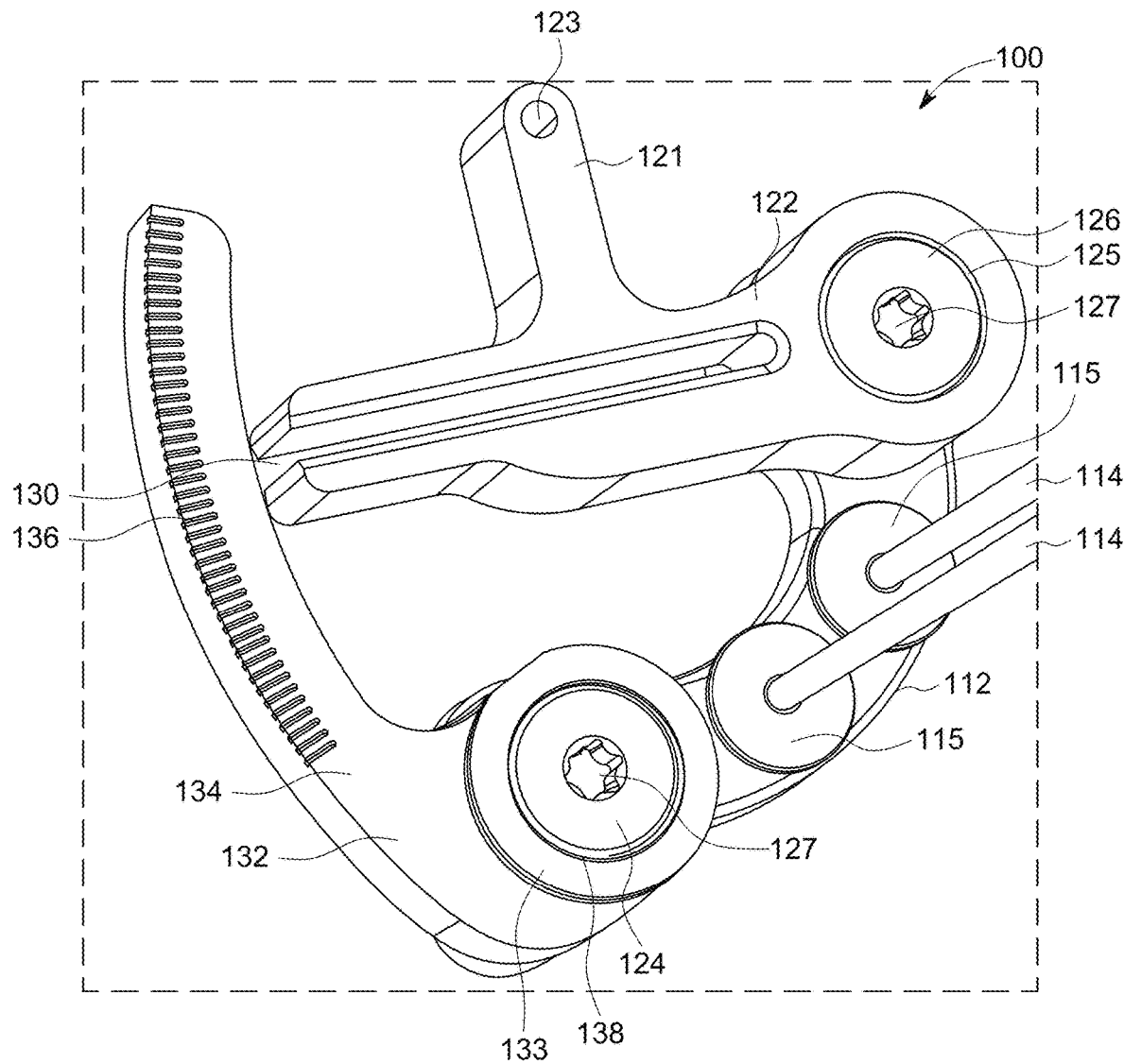
FIG. 2 is a front, enlarged perspective view of the exemplary tibial osteotomy system shown in FIG. 1, in accordance with an aspect of the present disclosure.
Figure 3:
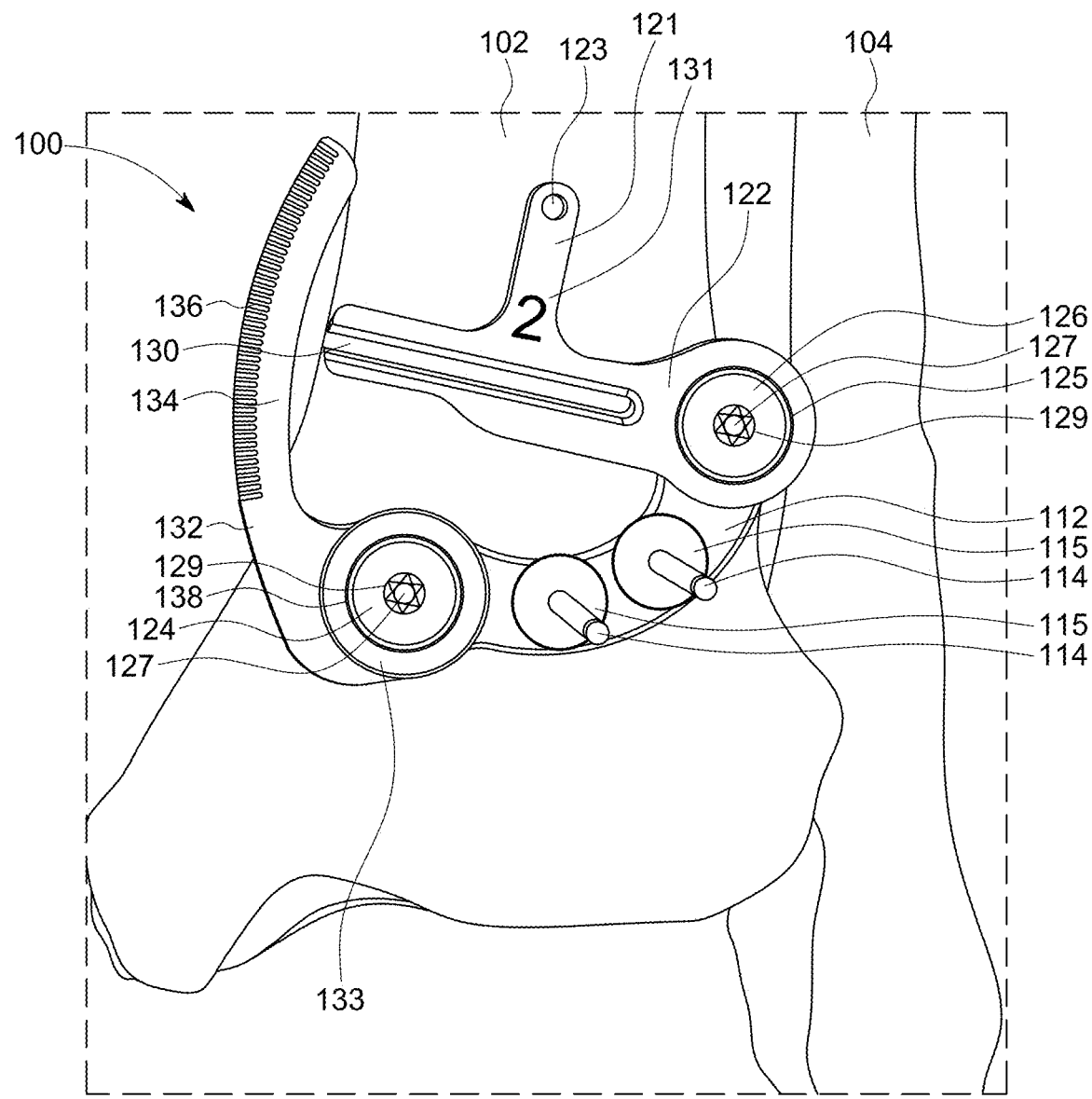
FIG. 3 is an alternate front perspective view of the exemplary tibial osteotomy system shown in FIG. 1, in accordance with an aspect of the present disclosure.
Figure 7:
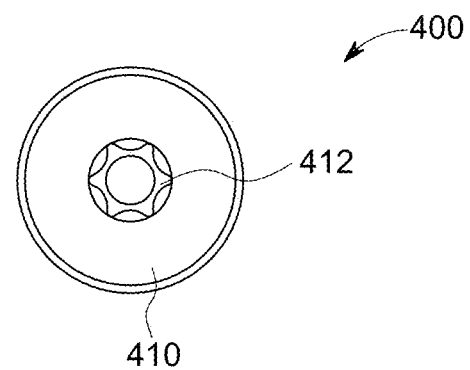
FIG. 7 is a top view of a coupling device of the exemplary tibial osteotomy system shown in FIG. 1, in accordance with an aspect of the present disclosure.
Figure 8:
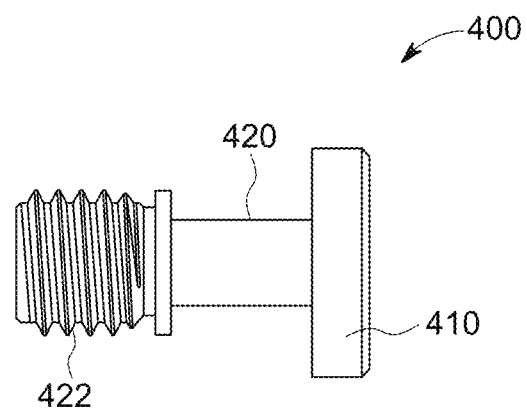
FIG. 8 is a side view of the coupling device shown in FIG. 7 of the exemplary tibial osteotomy system shown in FIG. 1, in accordance with an aspect of the present disclosure.
Figure 9:
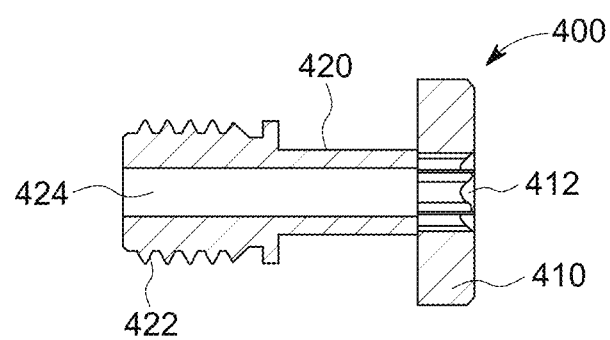
FIG. 9 is a side cross-sectional view of the coupling device shown in FIG. 7 of the exemplary tibial osteotomy system shown in FIG. 1, in accordance with an aspect of the present disclosure.

As shown in at least FIGS. 1-3, the osteotomy system 100 is shown to include a base plate 112, a cut guide 122, and a measuring arm 132. As shown in FIGS. 1 and 3, the base plate 112 is configured to contour to a curvature of the distal portion of the tibia 102. The base plate 112 is shown to couple with the cut guide 122 and the measuring arm 132 via a pair of coupling devices shown as a first screw 124 and a second screw 126. In some embodiments, the first screw 124 and the second screw 126 may be the same as a screw 400 as shown in FIGS. 7-9. The screw 400, which may be the same and/or similar to the first and second screws 124, 126 includes a head 412 having an interface 412. The screw 400 also includes a bore 424 extending along a central axis through the screw 400 (e.g., thus cannulating the screw 400). Additionally, the screw 400 includes a stem 420 which comprises a threading 422 along at least a portion of the stem 420.

The first screw 124 and the second screw 126 are shown to include an interface 127 as shown in FIGS. 1-3, which may be the same as and/or similar to interface 412 as shown in FIGS. 8-9. The interface 127 of the first screw 124 and the second screw 126 may be configured to accommodate the same tool or tools, or may be configured to accommodate multiple tools. Further, the interface 127 may be the same as and/or similar to the interface 412 of the screw 400. In some embodiments, the interface 127 of the first screw 124 may be the same as the second screw 126, for example a Torx screw drive (e.g., a 6-pointed star-shaped pattern, as shown in FIG. 3) or a hex screw drive (as shown in FIG. 1). Both the first screw 124 and the second screw 126 define a bore 129 (e.g., are cannulated) arranged about a central axis of the first and second screws 124, 126. The bore 129 extends along the entirety of the central axis of the first and second screws 124, 126 and establishes fluid communication through the first and second screws 124, 126 along said central axis. In some embodiments, the bore 129 may be configured concentrically about the central axis of the first and second screws 124, 126. Additionally, the bore 129 of the first and second screws 124, 126 is configured to receive a stabilization member, for example a K-wire. In some embodiments, such a stabilization member may be placed into the tibia 102 prior to the bore 129 receiving the stabilization member (e.g., the screws 124, 126 may be placed over the stabilization members while coupling the base plate 112, the cut guide 122, and the measuring arm 132. Alternatively, the screws 124,126 may be placed over the anterior surface of the tibia 102 such that the stabilization members may be inserted through the screws 124, 126 and moved toward and into the tibia 102 from an anterior direction toward a posterior direction.

The first screw 124 is shown to facilitate coupling of the base plate 112 with the measuring arm 132, where the bottom surface of the measuring arm 132 is configured to interface with a top surface of the base plate 112. The second screw 126 is shown to facilitate coupling of the base plate 112 with the cut guide 122, where the bottom surface of the cut guide 122 interfaces with the top surface of the base plate 112. In some embodiments, the first screw 124 and the second screw 126 may have the same and/or similar size and dimensions. For example, the first screw 124 may be compatible in coupling the base plate 112 and the cut guide 122 while the second screw 126 may be compatible coupling the base plate 112 and the measuring guide 132. Both the first and second screws 124, 126 are configured to facilitate coupling such that one or both of the coupled members may be translated relative to the other coupled member.

In some embodiments, the osteotomy system 100 may include one or more base plates 112 of varying sizes and/or curvatures in order to accommodate varying dimensions and geometries of the tibia 102. Further to the previous example, the one or more base plates 112 of the osteotomy system 100 may be configured to be compatible with and therefore couple/interface with other components of the osteotomy system 100, for example the cut guide 122 and the measuring arm 132 via the first and second screws 124, 126. In some embodiments, the osteotomy system 100 may include base plates 112 configured to accommodate tibial dimensions of patients of different sizes and ages. For example, the osteotomy system 100 may include three base plates 112 configured to accommodate small (e.g. pediatric), medium (e.g., average adult), and large (e.g., large adult) tibial dimensions.

Figure 4:
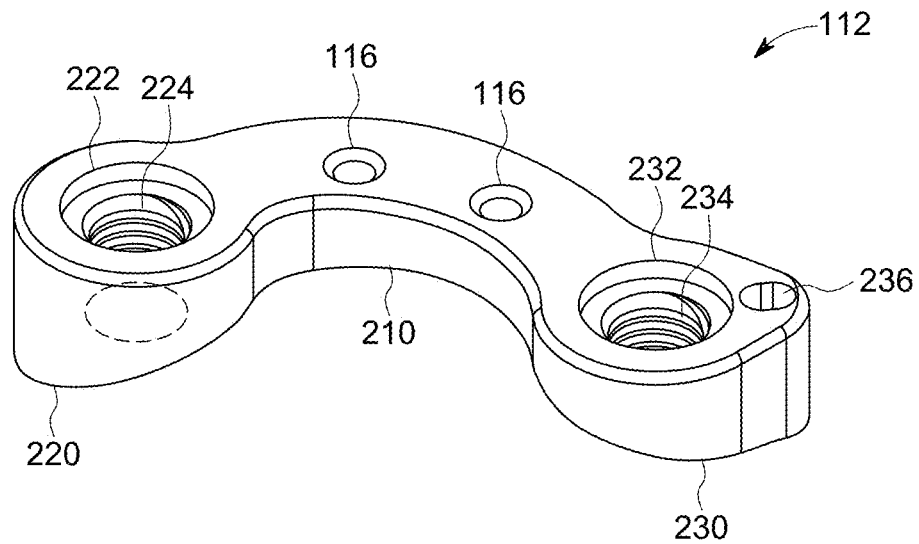
FIG. 4 is a side perspective view of a base plate of the exemplary tibial osteotomy system shown in FIG. 1, in accordance with an aspect of the present disclosure.
Figure 5:
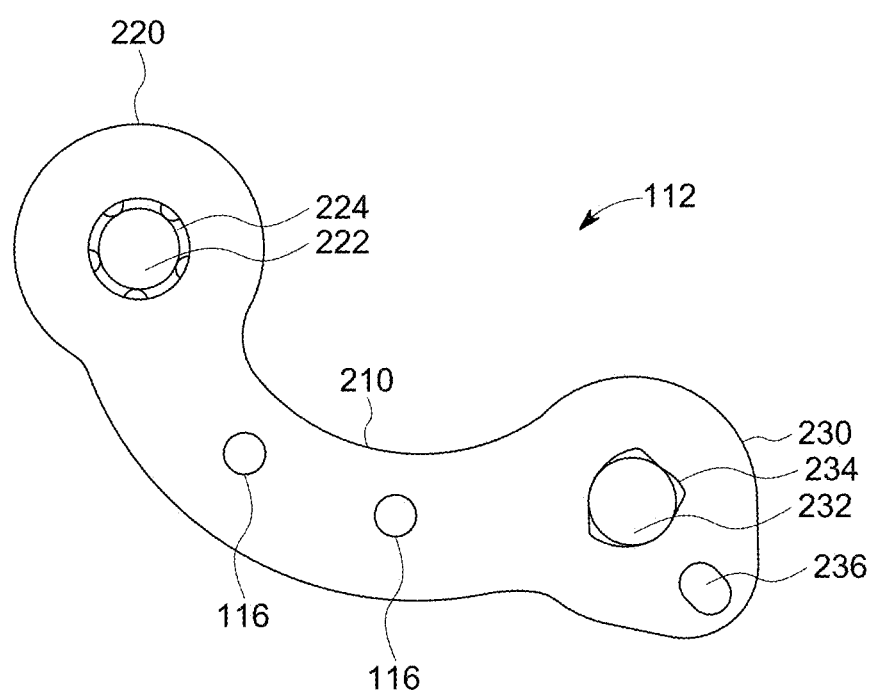
FIG. 5 is a bottom view of the base plate shown in FIG. 4 of the exemplary tibial osteotomy system shown in FIG. 1, in accordance with an aspect of the present disclosure.

The base plate 112, as shown in FIGS. 4-5, includes a first aperture 222 and a second aperture 232, with the first aperture 222 including a first threading 224 therein and the second aperture 232 including a second threading 234 therein. The first aperture 222 is arranged at a first end 220 of the base plate 112 while the second aperture 232 is arranged at a second end 230 of the base plate 112 opposite the first end (and the first aperture 222). In some aspects, the first aperture 222 and the second aperture 232 may be of the same and/or similar size (e.g., radius, depth, etc.) so as to provide compatibility with a common coupling device (e.g., the first and/or second screws 124, 126).

The base plate 112 is shown to include a body 210 disposed between the first aperture 222 and the second aperture 232, as shown in FIGS. 1-5. The body 210 is shown to have a substantially curved geometry so as to facilitate interfacing with the physiological geometry of the anterior portion of the tibia 102. In some aspects, the osteotomy system 100 may include one or more embodiment of the base plate 112, where the different embodiments of the base plate 112 include slight variations to the body 210 so as to best interface with the tibia 102 of the patient. For example, one alternate embodiment of the base plate 112 may include an elongated body 210 and/or a slightly different curvature of the body 210 (which, accordingly, would slightly alter the position of the first aperture 222 and second aperture 232 relative to one another). In some embodiments, the body 210 and therefore the base plate 112 may further include a curvature configured to accommodate the anterior surface of the tibia 102 such that the bottom surface of the base plate 112 is also curved (e.g., such that the base plate 112 begins to wrap around the curvature of the anterior portion of the tibia 102 when interfacing). Further, the osteotomy system 100 may include one or more base plates 112, with each configured to accommodate different sizes, geometries, and/or curvatures of the tibia 102.

The body 210 of the pair of apertures 116 arranged between the first aperture 222 and the second aperture 232, as shown in FIGS. 1-5. In some embodiments, the pair of apertures 11 may be of equal size so as to accommodate common hardware (e.g., such that the same hardware may be used with both of the pair of apertures 116). For example, as shown in FIGS. 1-3 and 13-18, each aperture of the pair of apertures 116 is configured to accommodate an olive wire 114. The olive wires 114 are received into and through the pair of apertures 116 when the base plate 112 is interfacing with the anterior surface of the tibia 102. Further, a portion of the olive wires 114 are inserted into the anterior portion of the distal tibia 102 until a stopper 115 of each of the olive wires 114 contacts the top surface of the base plate 112 adjacent the pair of apertures 116. The stopper 115 is disposed along each of the olive wires 114 and includes a lateral dimension substantially greater than that of each of the pair of apertures 116 so as to define a depth for which the olive wires 114 may be inserted into the tibia 102 (from the anterior direction). In some embodiments, the pair of aperture 116 may be sized to receive one or more calibers of the olive wires 114, for example a base plate configured for use with a smaller tibia 102 (e.g., a child) may include apertures 116 of a smaller caliber configured to accommodate a lesser caliber of olive wires 115. Similarly, the pair of apertures 116 may similar be sized to receive a large caliber of the olive wires 115 for use with a larger tibia 102 (e.g., larger adult).

When coupled with the cut guide 122 as shown in FIGS. 1-3 and 13-18, the first aperture 222 is configured to receive the first screw 124, where the first screw 124 is also received by an aperture 125 of the cut guide 122. With the cut guide 122 positioned on top of the base plate 112 such that the aperture 125 of the cut guide 122 is aligned with the first aperture 222 of the base plate 112, the second screw 126 is received by both the aperture 125 of the cut guide 122 and the first aperture 222 of the base plate 112. Accordingly, the second screw 126 includes a threading 422 as shown in FIGS. 8-9 that is configured to interface with a threading 224 of the first aperture 222. In some aspects, the aperture 125 of the cut guide 122 also includes a threading configured to interface with the threading 422 of the second screw 126. When coupled with the base plate 112 via the second screw 126 as received by the first aperture 222 of the base plate 112 and the aperture 125 of the cut guide 122, the cut guide 112 is configured to be translatable relative to the base plate 112 is the sagittal plane relative to the patient. For example, the cut guide 122 may be translatable such that the cut guide 122 pivots about the coupling point (e.g., the second screw 126 as received by the first aperture 222 of the base plate 112 and the aperture 125 of the cut guide 112) such that the cut guide 122 extends from the coupling point over the tibia 102.

Figure 6:
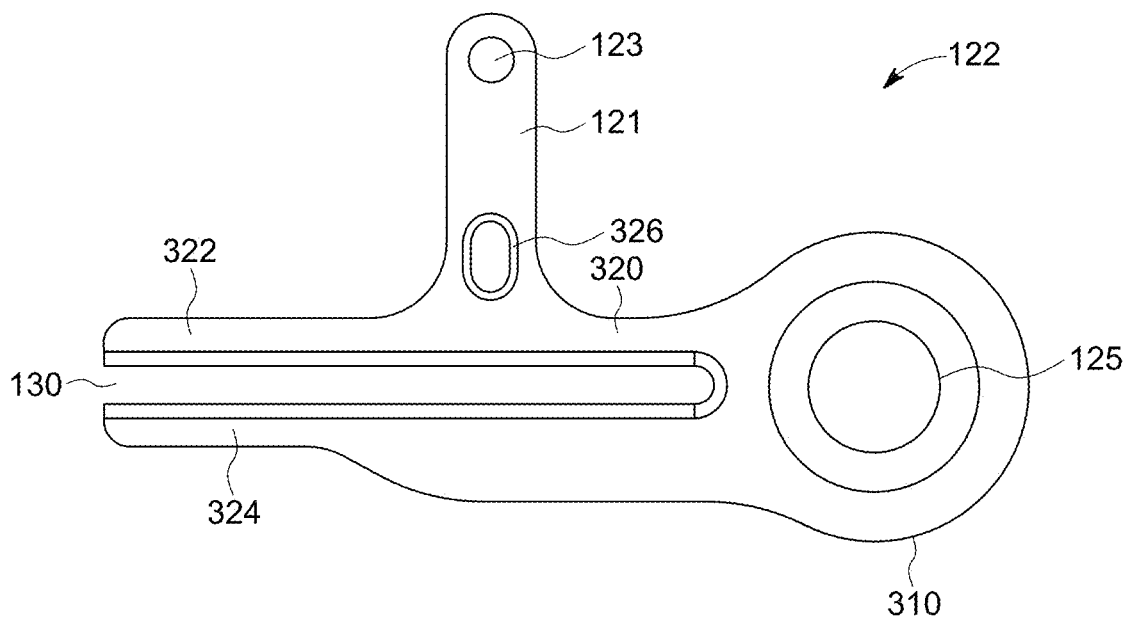
FIG. 6 is a top view of a cut system of the exemplary tibial osteotomy system shown in FIG. 1, in accordance with an aspect of the present disclosure.

The cut guide 122 is shown in FIGS. 1-3 and 13-18 as coupled with the base plate 112, and is further shown independently in FIG. 6. The cut guide 122 is shown to include a head portion 310 and a body portion 320 extending from the head portion 310. The body portion 320 includes a top arm 322 and a bottom arm 324, where the top and bottom arms 322, 324 define a slot 130 extending along the length of the body portion toward the head portion 310. The body portion 320 includes a protrusion 121 extending therefrom, where the protrusion 121 includes a first aperture 123. In some embodiments, the protrusion 121 is configured to extend from the body portion 320 at a substantially orthogonal angle. The first aperture 123 is configured at a distal end of the protrusion 121 (e.g., opposition the end where the protrusion 121 contacts the body portion 320). As shown in FIGS. 1 and 13-18, the first aperture 123 configured to receive a stabilization element shown as a K-wire 118. The first aperture 123 may have a substantially circular geometry, or may have other alternate geometries in order to accommodate other K-wires/stabilization elements. Additionally, the dimensions of the first aperture 123 may be configured to accommodate the K-wire 118 in various sizes/calibers. In some embodiments, the cut guide 122 may include a second aperture 326 along a portion of the protrusion 121, with the second aperture 326 configured to accommodate one or more tools and/or stabilization members.

The osteotomy system 100 may also include one or more cut guides 122 configured to accommodate biplanar correction performed by one or more surgeons in performing a distal tibial osteotomy. This biplanar correction provided by the cut guide 122 is provided in the frontal plane (i.e., coronal plane) relative to the patient so as to space the cut guide 122 closer or further from the anterior surface of the tibia 102 when translated above the tibia 102 in the sagittal plane relative to the patient. In some embodiments, the one or more cut guides 122 may be configured to facilitate biplanar correction performed at set incremental degree measurements. For example, the cut guide 122 as shown in FIG. 3 includes a marking 131 of "2" indicating that the cut guide 122 is configured to provide 2° of biplanar correction in the frontal plane. The one or more cut guides 122 of the osteotomy system 100 may be configured to facilitate incremental biplanar correction in the frontal plane ranging from −6° to 6°. For example, the osteotomy system 100 may include seven cut guides 122 facilitating biplanar correction of −6°, −4°, −2°, 0°, 2°, 4°, and 6°.

The measuring arm 132 is configured to be coupled with the base plate 112 similarly to the cut guide 112. As shown in FIGS. 1-3, 10-12, and 13-18, the measuring arm 132 includes a head 133 having an aperture 138. The aperture 138 of the measuring arm 132 is configured the same as and/or similar to the aperture 125 of the cut guide 122. As shown in FIGS. 1-3 and 13-18, the aperture 138 of the measuring arm 132 is configured to receive the first screw 124. Additionally, the aperture 138 of the measuring arm 132 is configured to have dimensions the same as and/or similar to the second aperture 232 of the base plate 112. In coupling with the base plate 112, the measuring arm 132 is positioned on top of the base plate 112 such that the bottom surface of the measuring arm 132 interfaces with the top surface of the base plate 112. Additionally, the aperture 138 of the measuring arm 132 is positioned about a common axis with the second aperture 232 of the base plate such that the first screw 124 may be received by the aperture 138 of the measuring arm 132 and the second aperture 232 of the base plate, thus facilitating coupling. As shown in FIGS. 4-5, the second aperture 232 includes the second threading 234 configured to facilitate coupling and retention of the first screw 124 by interfacing with the corresponding threading 422 of the first screw 124 (as shown in FIGS. 8-9. In some embodiments, the measuring arm 132 may be couplable with the base plate 112 via the second screw 126 as well as the first screw 124. For example, the aperture 138 of the measuring arm 132 and the aperture 125 of the cut guide 122 may be configured to have the same and/or similar dimensions (e.g., radius, depth, etc.) so as to accommodate common coupling devices such as the first and second screws 124, 126.

Figure 10:
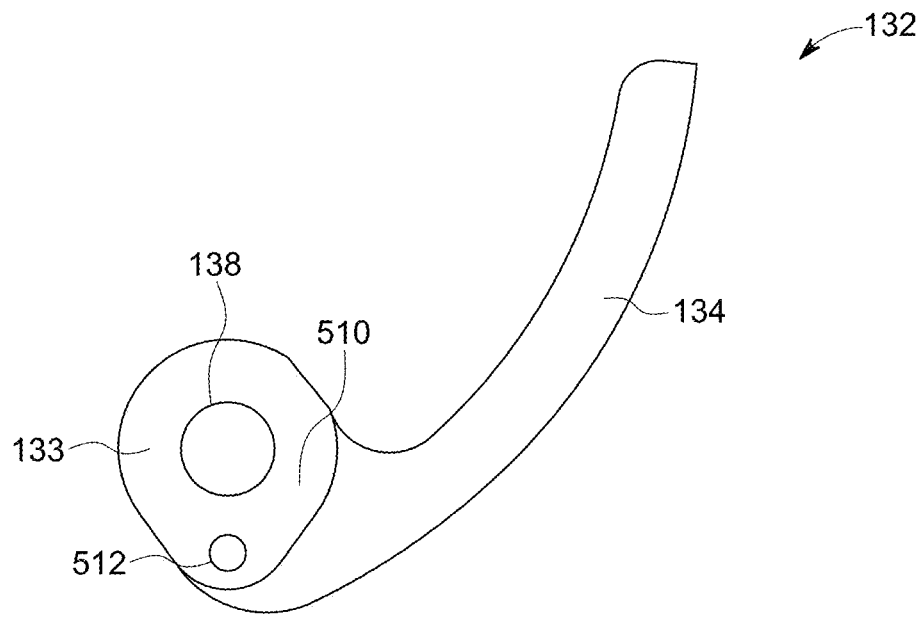
FIG. 10 is a bottom view of a measuring arm of the exemplary tibial osteotomy system shown in FIG. 1, in accordance with an aspect of the present disclosure.
Figure 11:
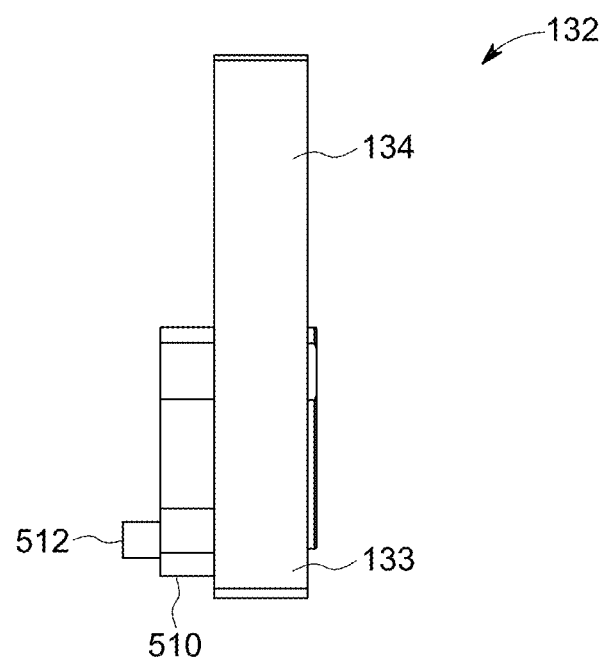
FIG. 11 is a side view of the measuring arm shown in FIG. 10 of the exemplary tibial osteotomy system shown in FIG. 1, in accordance with an aspect of the present disclosure.
Figure 12:
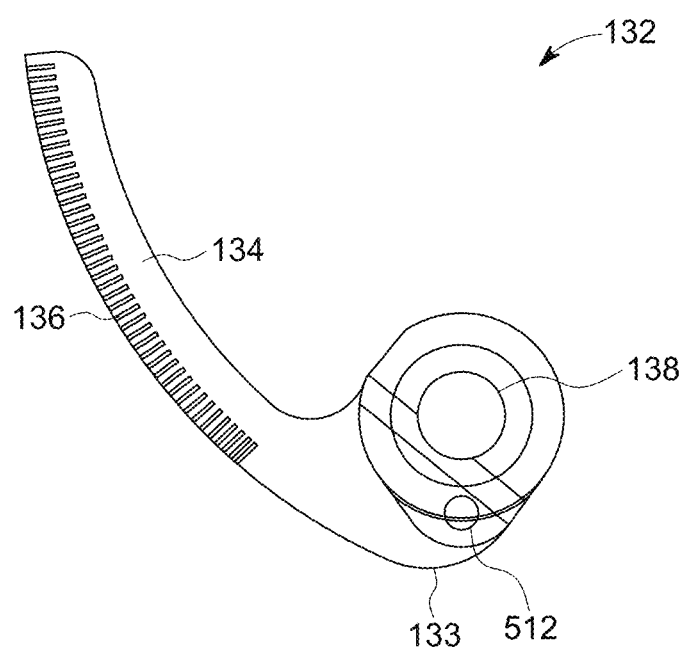
FIG. 12 is a top cross-sectional view of the measuring arm shown in FIG. 10 of the exemplary tibial osteotomy system shown in FIG. 1, in accordance with an aspect of the present disclosure.
Figure 13:
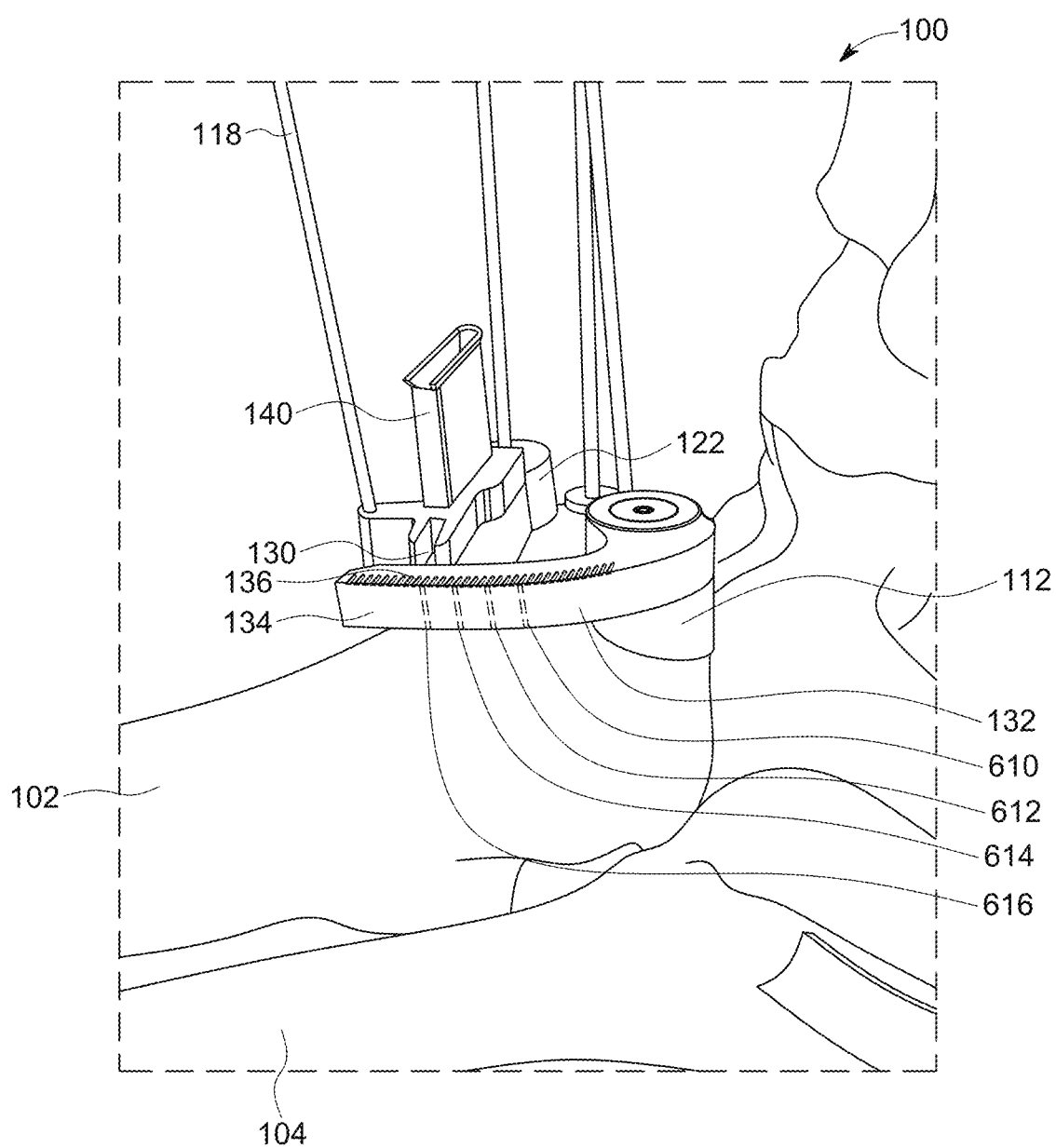
FIG. 13 is a side perspective view of the exemplary tibial osteotomy system of FIG. 1 positioned at the distal portion of the tibia, in accordance with an aspect of the present disclosure.

The measuring arm 132, as shown coupled with the base plate 112 in FIGS. 1-3 and 13-18 and further shown independently in FIGS. 10-12 includes a head portion 133 and an arm portion 134 extending from the head portion 133. The head portion, as shown in FIGS. 10-12, includes a protuberance 512 extending from a protrusion 510 disposed on the bottom surface of the measuring arm 132. The protuberance 512 is shown to couple with a bore 236 of the base plate 112 as shown in FIGS. 4-5. Accordingly, the coupling of the protuberance 512 with the bore 236 prevents movement/translation of the measuring arm 132 relative to the base plate 112. The arm portion 134 is shown to have a curved geometry such that when coupled with the base plate 112 (and the bottom surface of the base plate 112 interfacing with the anterior surface of the tibia 102) the curvature of the arm portion 134 is curved toward a medial portion of the tibia 102.

Additionally, the arm portion 134 is shown to include a guide portion 136. The guide portion 136 includes angle measurements (e.g., 0°-15°). With the base plate 112 coupled with the tibia 102 via the olive wires 114 and the measuring arm 132 coupled with the base plate 112 (and the protuberance 512/bore 236 preventing relative movement thereof), the cut guide 122 may be pivoted about the coupling point (with the second screw 126). The guide portion 136 of the measuring arm 132 is arranged such that manipulation of the cut guide 122 aligns the central portion of the slot 122 facilitates measurement using the guide portion 136. As shown in FIGS. 13-17, the slot 130 of the cut guide 122 is configured to removably receive a measurement flag 140.

Figure 14:
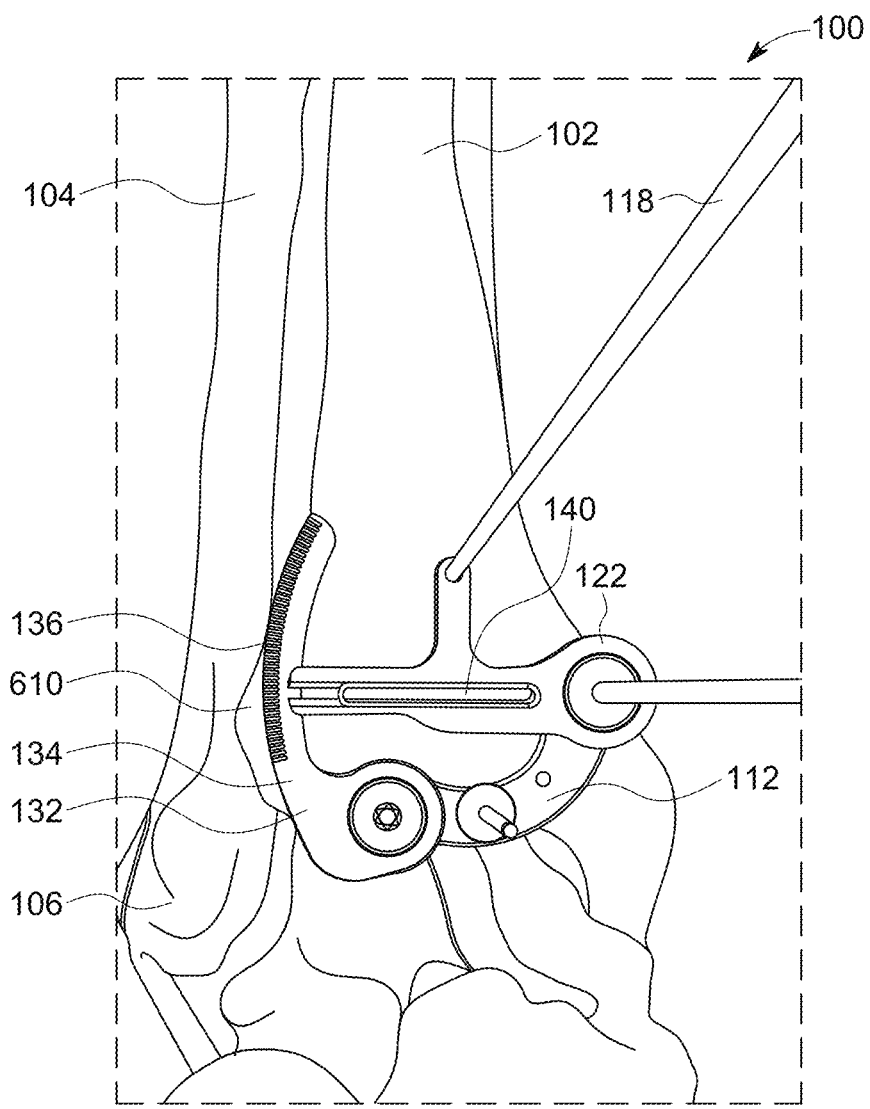
FIG. 14 is a front perspective view of the exemplary tibial osteotomy system of FIG. 1 positioned at the distal portion of the tibia, in accordance with an aspect of the present disclosure.
Figure 15:
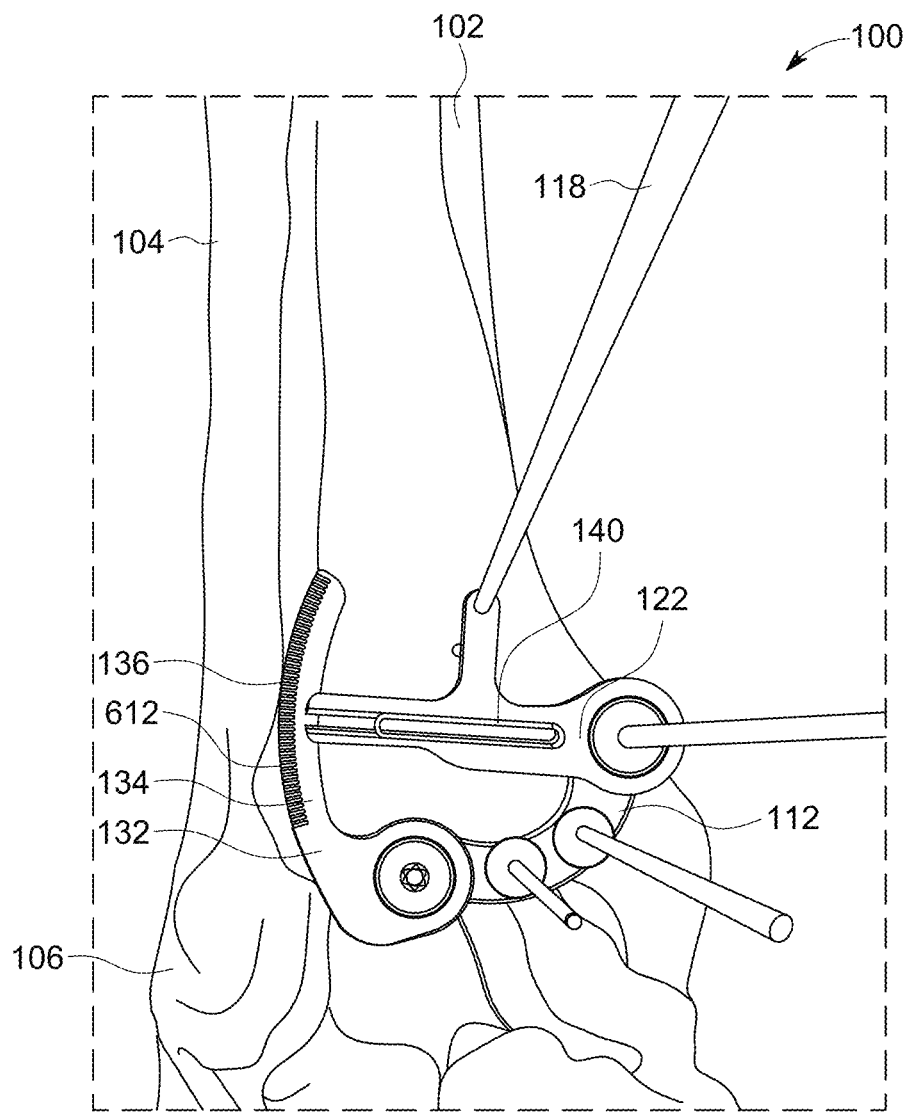
FIG. 15 is an alternate front perspective view of the exemplary tibial osteotomy system of FIG. 1 positioned at the distal portion of the tibia, in accordance with an aspect of the present disclosure.
Figure 16:
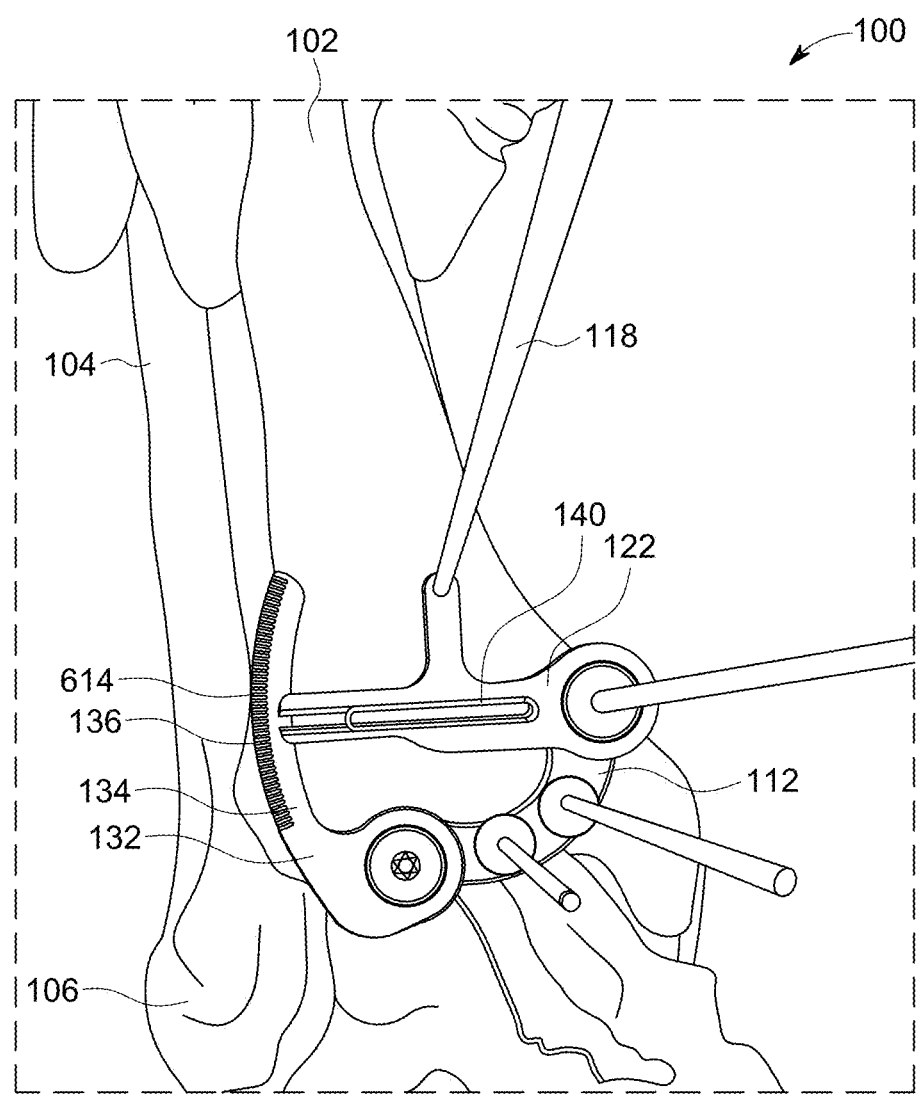
FIG. 16 is an alternate front perspective view of the exemplary tibial osteotomy system of FIG. 1 positioned at the distal portion of the tibia, in accordance with an aspect of the present disclosure.
Figure 17:
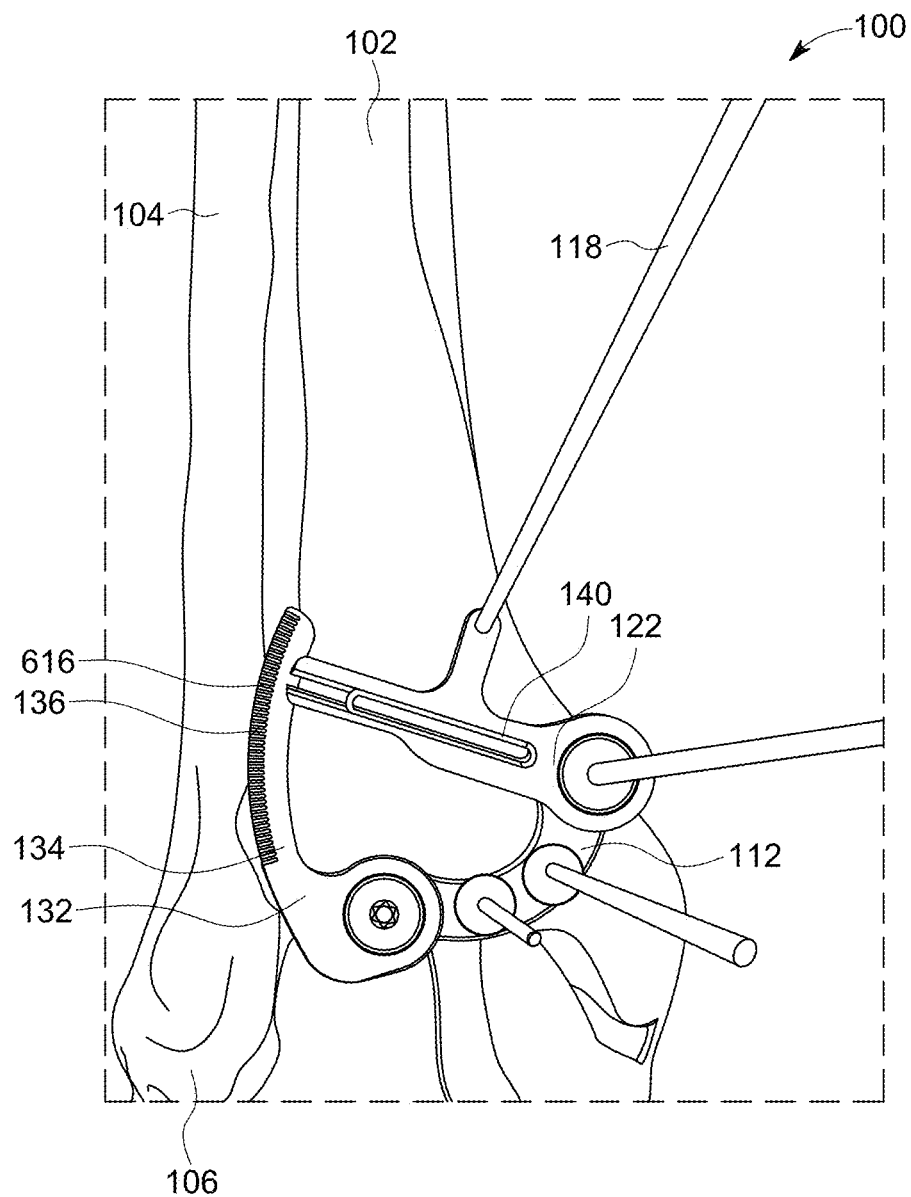
FIG. 17 is an alternate front perspective view of the exemplary tibial osteotomy system of FIG. 1 positioned at the distal portion of the tibia, in accordance with an aspect of the present disclosure.

The measurement flag 140 is configured to facilitate angle measurement of the slot 130 of the cut guide 122 relative to a perpendicular angle with the midline of the tibia 102. For example, as shown in FIG. 14, the measurement flag 140 (and therefore the slot 130 of the cut guide 122 is adjacent a 0° marking 610 of the guide portion 136 of the measuring arm 132. This 0° position corresponds to an orientation of the measurement flag 140 (and thus slot 130) that is perpendicular with a midline of the tibia 102 (where the midline of the tibia 102 intersects the transverse plane). Accordingly, the cut guide 122 may be manipulated (e.g., translated, pivoted) such that the measurement flag 140 identifies various degree measurements along the anterior surface of the tibia 102 relative to the 0° position. For example, FIG. 15 shows the measurement flag 140 adjacent a 5° marking 612, thus indicating an angle of 5° above the 0° marking 610. Similarly, FIG. 16 shows the measurement flag 140 adjacent a 10° marking 614, thus indicating an angle of 10° above the 0° marking 610. FIG. 17 shows the measurement flag 140 adjacent a 15° marking 616, thus indicating an angle of 15° above the 0° marking 610. In some embodiments, the guide portion 136 may include measurements greater than 15° (e.g., up to 90°). Additionally, the increments of the guide portion 136 may be other than 5° (e.g., 2°, 10°, etc.). In the embodiment shown in FIGS. 1-18, manipulation of the cut guide 122 and components thereof occurs with other components of the osteotomy system 100 in a fixed position (e.g., the cut guide 122 is the only component that moves relative to the tibia 102).

Figure 18:
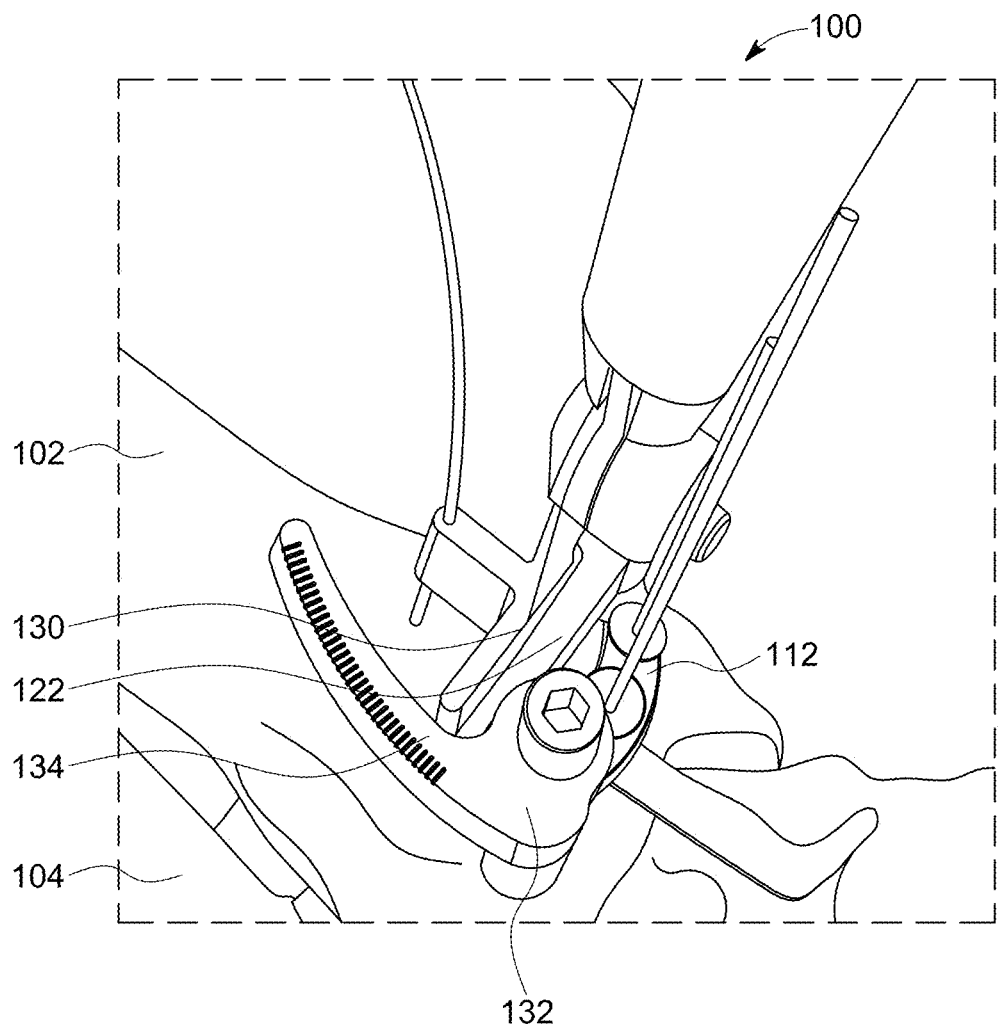
FIG. 18 is a side perspective view of a surgical tool implemented in conjunction with the exemplary tibial osteotomy system of FIG. 1 positioned at the distal portion of the tibia, in accordance with an aspect of the present disclosure.

As shown in FIGS. 13-17, the stabilization element shown as K-wire 118 has been repositioned in the tibia 102 as the cut guide 122 has been manipulated through the 15° degree range as measured on the guide portion 136 of the measuring arm 132. As shown in FIGS. 1-3 and 18, the measurement flag 140 may be removed from the slot 130 of the cut guide 122. Accordingly, removal of the cut guide 122 facilitates marking and/or cutting of the tibia 102 by one or more surgeons. For example, a surgeon may manipulate the cut guide 122 such that measurements may be taken using the measurement flag 140 at the 610 (0°) and 614 (10°) positions. Then, as shown in FIG. 18, the surgeon may implement a cutting tool shown as a sagittal saw 620 such that a blade 622 thereof is positioned within the slot 130. Accordingly, the surgeon may then make one or more cuts with the blade 622 disposed within the cut guide 122 to ensure that cuts are made in the tibia 102 at the desired angle (in this example, 10°). In some embodiments, the slot 130 is positioned such that angular correction guidance is provided in the frontal plane to facilitate one or more surgeons in making one or more cuts of the tibia 102.

Precise cuts using the osteotomy system 100 facilitate the cutting and/or removal of a distal portion of the tibia 102 according to an angle desired by the surgeon. In some embodiments, the surgeon may place an implant of comparable angle measure within a void left following removal of a distal portion of the tibia 102 as a result of the cuts made within the slot 130 of the cut guide 122. In some embodiments, the placement of the osteotomy system 100 on the tibia 102 of the patient may be imperfect (e.g., small gaps between the bottom surface of the base plate 112 and the anterior surface of the tibia 102). Accordingly, and as with surgical procedures, measurements taken using the cut guide 122 (and components thereof) as well as the measuring arm 132 may include small amounts of error. For example, in some embodiments such measurements may include error of <1.°

As shown in FIGS. 19-27, alternate embodiments of the osteotomy system 100 are shown. In some embodiments, the osteotomy system shown includes one or more components that are similar to and/or the same as those shown in the osteotomy system 100. For example, some alternate embodiments may include components the same as and/or similar to the base plate 112, the cut guide 122, and the measuring arm 132. Additionally, some embodiments may implement the same and/or similar coupling mechanisms, for example screws having a bore (e.g., cannulated). The alternate embodiments shown in FIGS. 19-27 include systems that may be implemented in performing a tibial osteotomy such as, for example, a distal tibial osteotomy.

Figure 19:
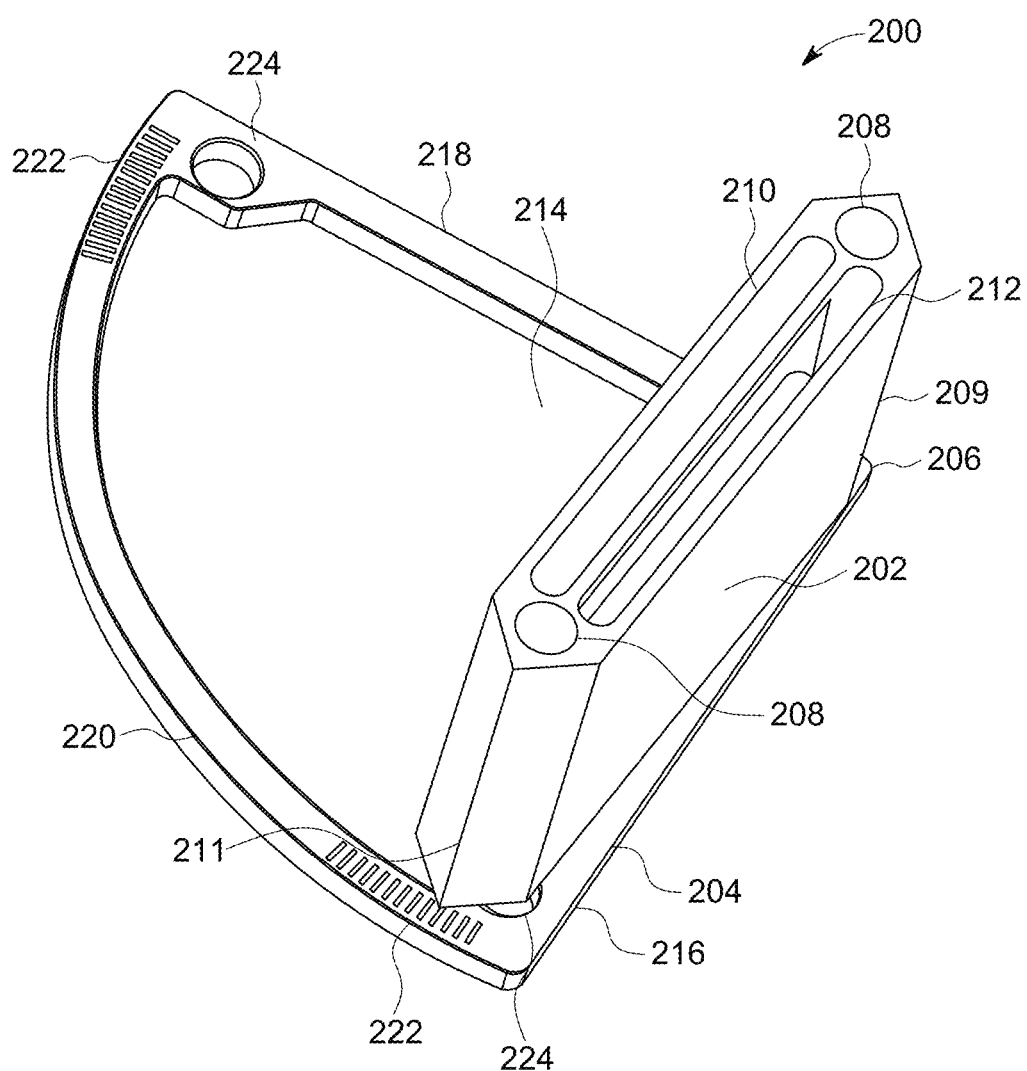
FIG. 19 is a perspective view of an alternate embodiment of an exemplary tibial osteotomy system, in accordance with an aspect of the present disclosure.

Referring now to FIG. 19, an osteotomy system 200 is shown, according to an exemplary embodiment. The osteotomy system 200 is shown to include a surgical guide 202 coupled with (releasably, pivotably, or otherwise) a base 204. In some aspects, the base may include a semi-circular geometry (e.g., that of a quarter of a circle as shown in FIG. 19) with a pivot point and/or coupling portion of the surgical guide 202 and the base 204 positioned substantially near a center point of said circle and/or semi-circle. The surgical guide 202 is shown to include a body 206, with said body including a pair of bores 208 extending substantially through the height of the body 206, as well as a first cut slot 210 and a second cut slot 212 positioned substantially parallel one another and arranged adjacent the pair of bores 208. In some aspects, the pair of bores 208 may be configured to receive a coupling element, for example a k-wire to couple and/or stabilize the surgical guide with the tibia of a patient. The first and second cut slots 210, 212 extend through the body 206 such that a cutting instrument may be received therein. In some aspects, the body 206 may include a first protrusion 209 and a second protrusion 211 disposed at opposite ends thereof. Further, in some aspects one or more of the first and second protrusions 209, 211 may be configured to align with at least a portion of an arced portion 220 of the base 204, where the arced portion extends between a first base member 216 and a second base member 218 which form a substantially right angle. In some aspects, the arced portion 220 may include measuring marks 222 disposed thereon such that pivoting of the surgical guide 202 relative to the base 204 may be measured based on alignment of one or more of the first and second protrusions 209, 211 with the measuring marks 222. Further, the base 204 is shown to include a pair of apertures 224 configured to facilitate coupling with various musculoskeletal structures (e.g., tibia) of a patient via k-wires or other coupling elements.

Figure 20:
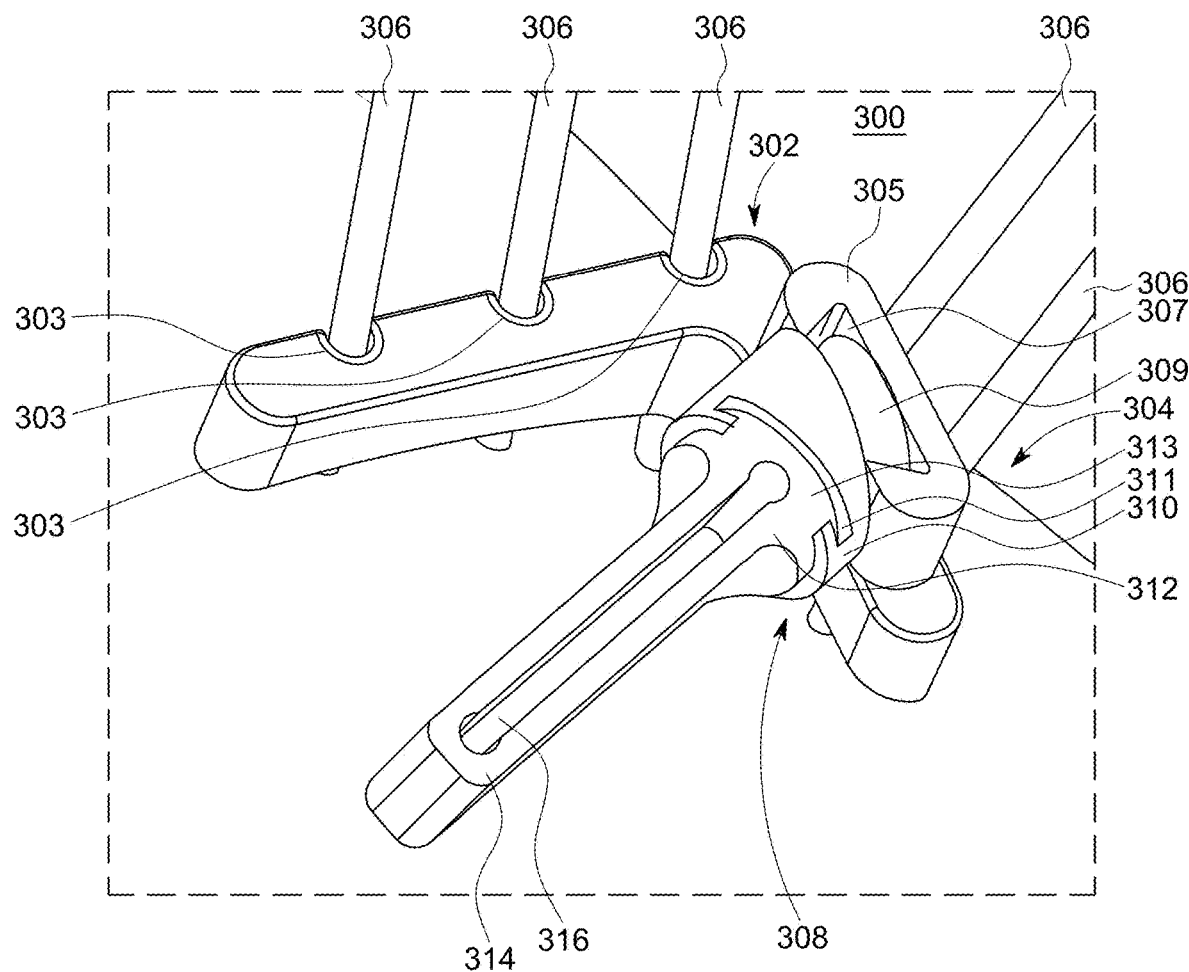
FIG. 20 is a perspective view of another alternate embodiment of an exemplary tibial osteotomy system, in accordance with an aspect of the present disclosure.

Referring now to FIG. 20, an osteotomy system 300 is shown, according to an exemplary embodiment. The osteotomy system 300 is shown to include a base 302 coupled with a musculoskeletal structure 308 via coupling elements 306 (e.g., k-wires, stabilization wires, etc.) received within apertures 303 disposed variously about the base 302. Further, the base 302 is shown to be coupled with (releasably, pivotably, or otherwise) a surgical guide 304. In some aspects, the base may include a substantially L-shaped geometry (e.g., includes one or more leg portions) with a coupling portion of the surgical guide 304 and the base 302 being positioned substantially near one of the legs of the L-shape. The surgical guide 304 is shown to include a body 305 having a coupling portion 307, where a cut guide 310 (or a portion thereof) may be received within said coupling portion 307 in a dovetail coupling mechanism. The cut guide 310 may include a recess 311 which may be the same as and/or similar to the coupling portion 307, with said recess configured to receive at least a portion of an insert 312 therein (e.g., an extension 313 having via a dovetail coupling). The insert 312 includes a base 313 from which a protuberance 314 extends, wherein the protuberance 314 includes a cut slot 316 configured to receive at least a portion of a cutting instrument. In the osteotomy system 300, one or more cut guides which are the same as and/or similar to the cut guide 310 may be releasably coupled and/or decoupled with the surgical guide 304 to address various circumstances (size, topography, etc.). Similarly, one or more inserts that are the same as and/or similar to the insert 312 may be releasably coupled/decoupled with the recess 311.

Figure 21:
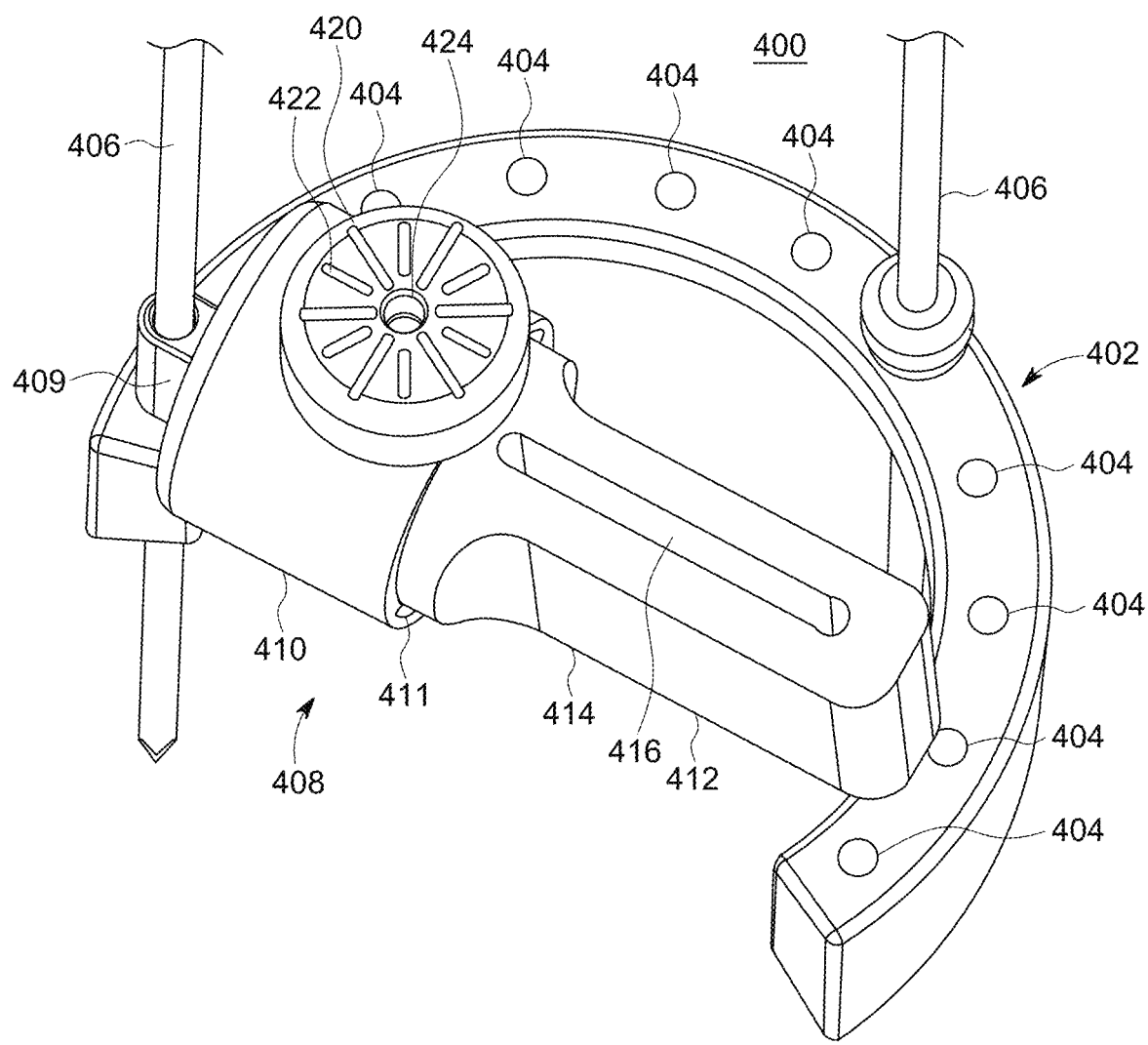
FIG. 21 is a perspective view of another alternate embodiment of an exemplary tibial osteotomy system, in accordance with an aspect of the present disclosure.
Figure 22:
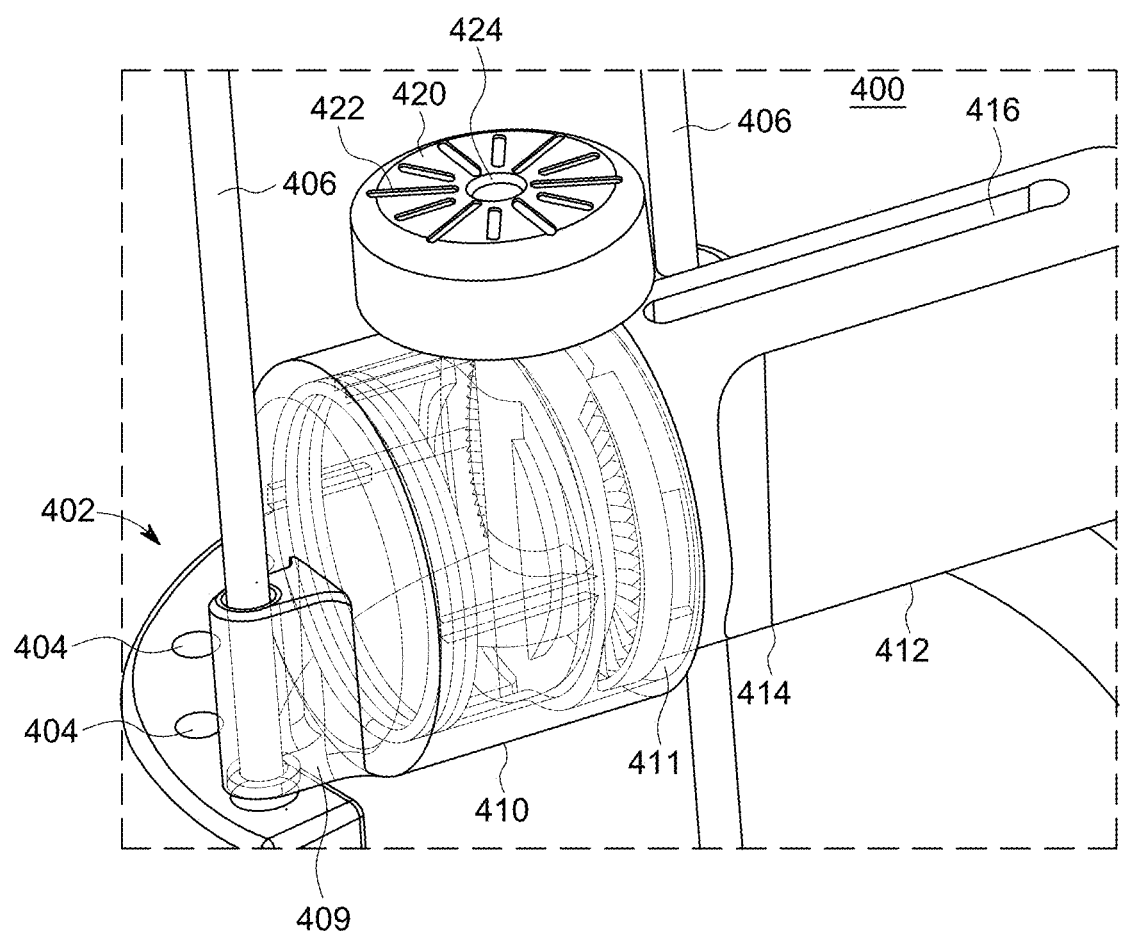
FIG. 22 is a perspective view of the tibial osteotomy system of FIG. 21, in accordance with an aspect of the present disclosure.
Figure 23:
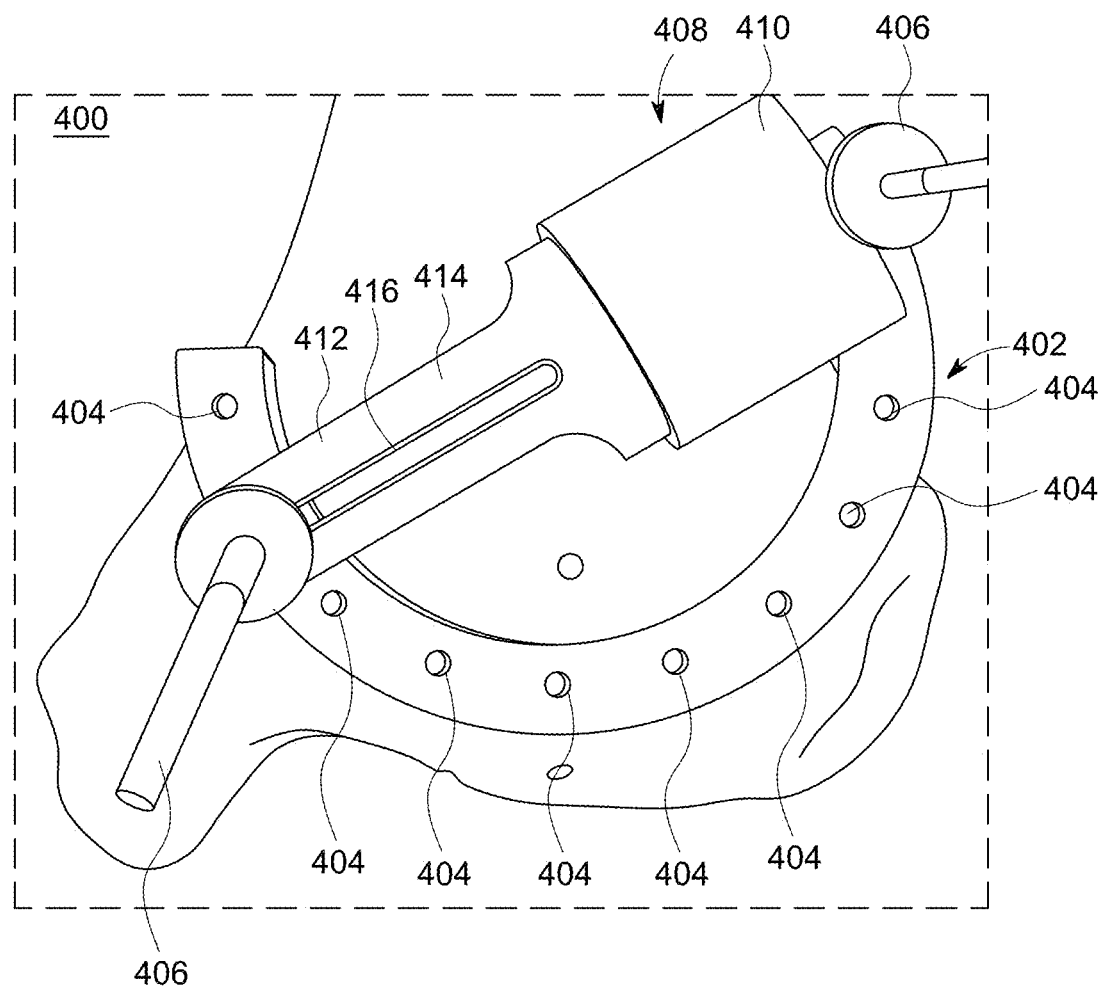
FIG. 23 is an alternate perspective view of the tibial osteotomy system of FIG. 21, in accordance with an aspect of the present disclosure.

Referring now to FIGS. 21-23, an osteotomy system 400 is shown, according to an exemplary embodiment. The osteotomy system 400 is shown to include a base 402 having a substantially semi-circular geometry, with the base 402 including bores 404 disposed about the base and configured to receive stabilization elements 406 therethrough so as to facilitate stabilization and releasable coupling with one or more musculoskeletal structures. The osteotomy system 400 is further shown to include a surgical guide 408 configured to releasably couple with at least one of the stabilization elements 406 via a coupling mechanism 409 (e.g., an extension with a complimentary bore to the stabilization elements 406) such that the surgical guide 408 may be pivoted about the coupling mechanism 409. The surgical guide 408 is shown to include a cut guide 414 releasably coupled with the surgical guide 408 via a base 410 of the surgical guide 408. The base 410 is shown to include a recess within which at least a portion of the cut guide 414 may be positioned and/or coupled. The cut guide 414 includes an extension 412 having a slot 416 disposed therein (with the slot 416 having a substantially elongated geometry). The extension 412 may be configured such that the distal-most portion of the extension 412 is configured to be positioned adjacent at least a portion of the base 402 when the surgical guide 408 (and components coupled therewith) is (are) pivoted about the coupling mechanism 409 (e.g., defines a circular pivot path). The cut guide 414 is shown to releasably couple with the surgical guide 408 such that one or more cut guides that are the same as and/or similar to the cut guide 414 may be interchanged within the surgical guide 408. The surgical guide 408 includes an actuator 420 disposed on an upper portion thereof and is configured to releasably retain the cut guide 414 within at least a portion of the surgical guide 408 (so as to facilitate releasable coupling). The actuator 420 includes interval marks 422 disposed thereon configured to indicate actuation of the actuator 420 (e.g., relative to rotational actuation). The actuator 420 also includes a coupling mechanism 424 positioned in a central portion thereof and configured to couple the actuator 420 with the surgical guide 408.

Figure 24:
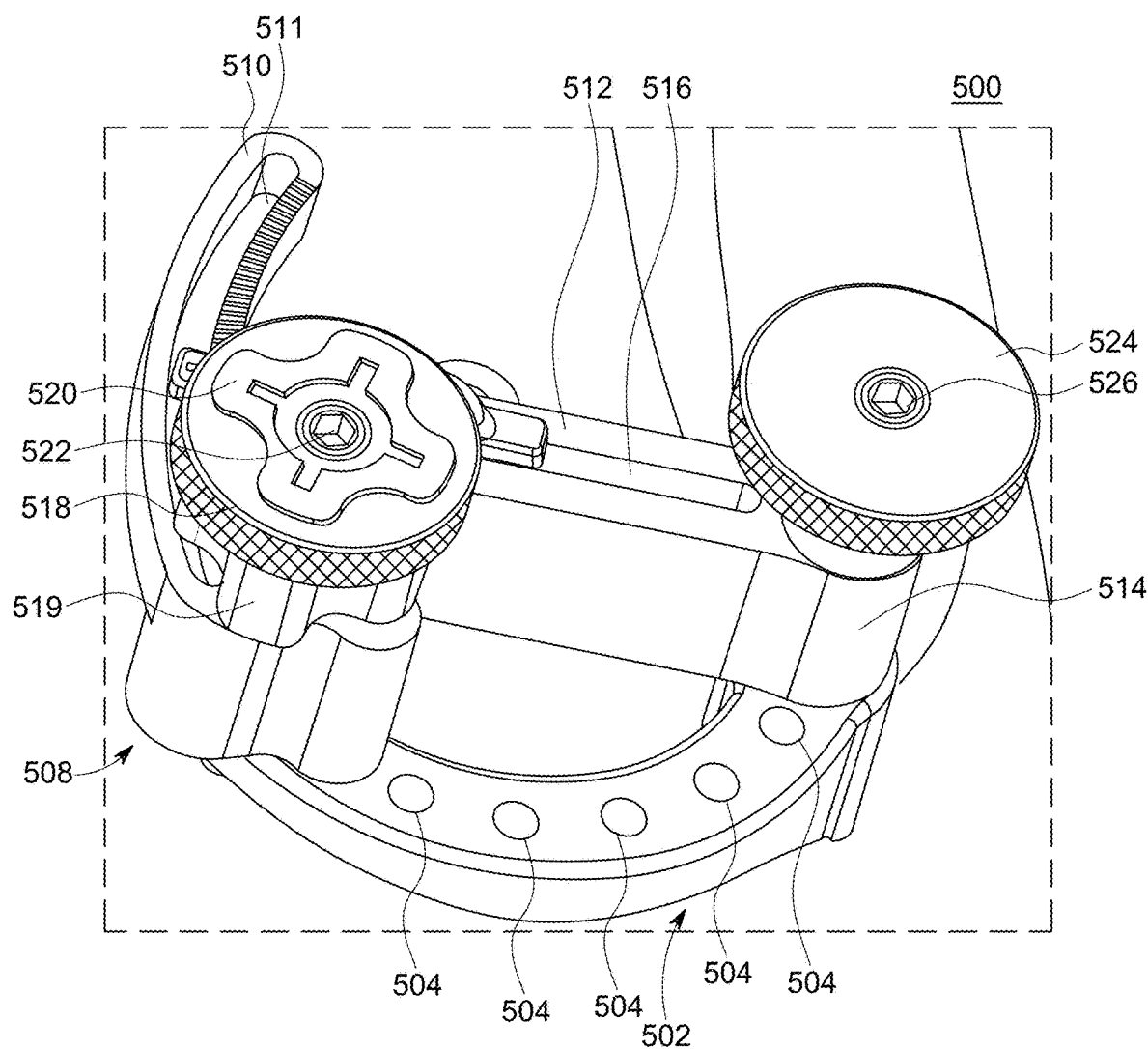
FIG. 24 is a perspective view of another alternate embodiment of an exemplary tibial osteotomy system, in accordance with an aspect of the present disclosure.

Referring now to FIG. 24, an osteotomy system 500 is shown, according to an exemplary embodiment. The osteotomy system 500 is shown to include a base 502 having a substantially semi-circular geometry, with the base 502 including bores 504 disposed about the base and is configured to receive stabilization elements therethrough so as to facilitate stabilization and be releasably coupled with one or more musculoskeletal structures. The osteotomy system 500 is further shown to include a surgical guide 508 configured to releasably couple with at least one of the stabilization elements via a coupling mechanism such that the surgical guide 508 may pivoted about the coupling mechanism. The surgical guide 508 includes an extension 510 having a substantially curved geometry, wherein the extension 510 includes a recess 511 (which in some embodiments may extend through the extension 511). The surgical guide 508 is shown to include a first actuator 520 disposed substantially superior relative to the surgical guide 508 where the first actuator 520 may be manipulated (e.g., rotated) to translate the surgical guide 508 about a coupling point with the base 502 such that the surgical guide 508 pivots about said coupling point. In some aspects, a spacer 519 may be positioned between the surgical guide 508 and the first actuator 520. The first actuator 520 is shown to include a texture 518 about an outer edge thereof to facilitate grip when rotating the first actuator 520, as well as coupling mechanism 522 which is configured to couple the first actuator with the surgical guide 508 and the spacer 519. The osteotomy system 500 further includes a cut guide 514 coupled with (e.g., releasably, pivotably, etc.) a portion of the base 502. The cut guide 514 is shown to include an extension 512 having a slot 516 disposed therethrough, where the slot 516 has a substantially elongated geometry and is configured to receive at least a portion of a cutting instrument. The cut guide 514 is further shown to include a second actuator 524 configured to be rotated (e.g., actuated) such that rotation of the actuator 524 drives the pivoting motion of the cut guide 514 about a coupling point with the base 502. The actuator 524 further includes a coupling mechanism 526 configured to couple the actuator 524 with the cut guide 514 and the base 502.

Figure 25:
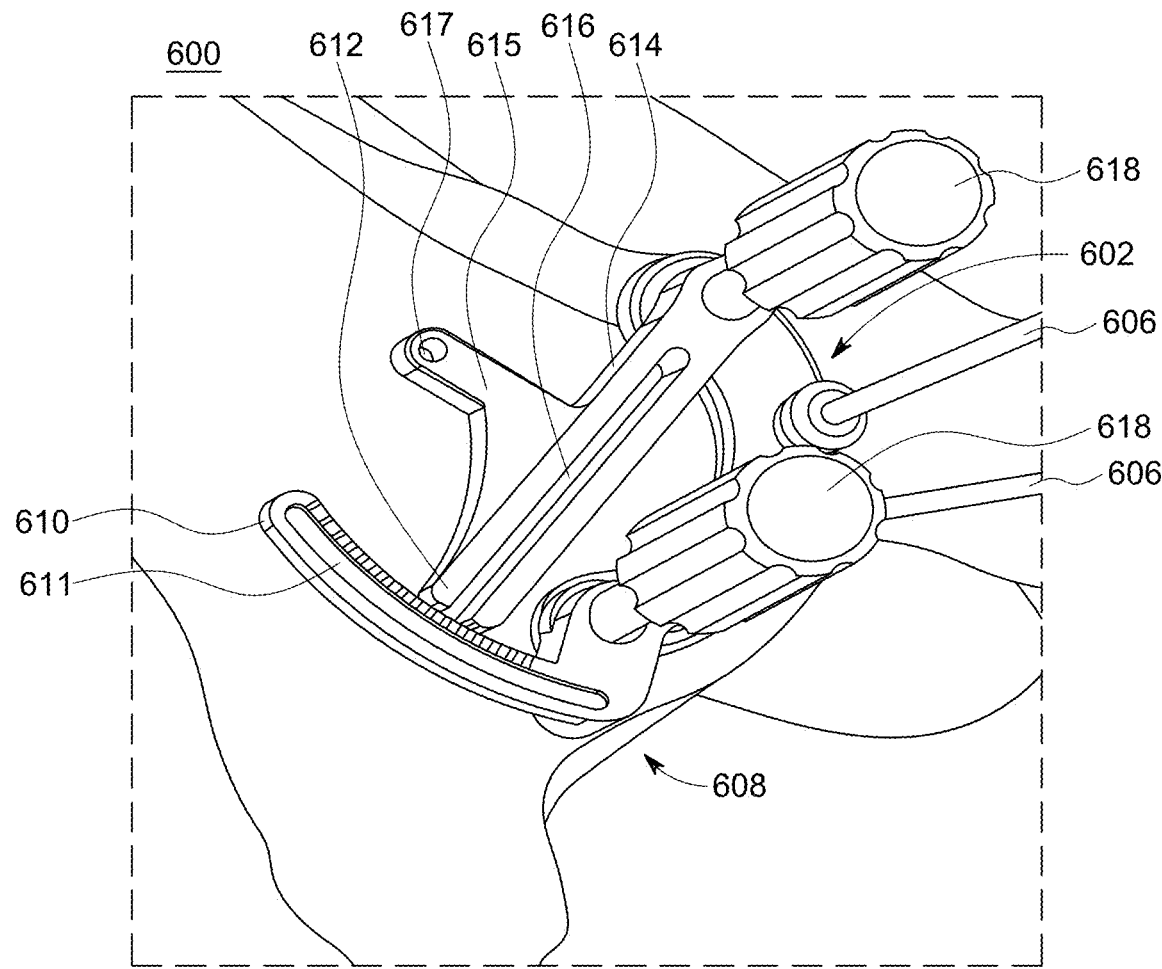
FIG. 25 is a perspective view of another alternate embodiment of an exemplary tibial osteotomy system, in accordance with an aspect of the present disclosure.

Referring now to FIG. 25, an osteotomy system 600 is shown, according to an exemplary embodiment. The osteotomy system 600 is shown to include a base 602 having a substantially semi-circular geometry, with the base 602 including bores (not shown) disposed about the base and configured to receive stabilization elements 606 therethrough so as to facilitate stabilization and be releasably coupled to one or more musculoskeletal structures. The osteotomy system 600 is further shown to include a surgical guide 608 configured to releasably couple with at least one of the stabilization elements 606 via a coupling mechanism such that the surgical guide 608 may be pivoted about the coupling mechanism. The surgical guide 608 includes an extension 610 having a substantially curved geometry, wherein the extension 610 includes a recess 611 (which in some embodiments may extend through the extension 611). The surgical guide 608 is shown to include an actuator 618 disposed substantially superior relative the surgical guide 608 where the actuator 618 may be manipulated (e.g., rotated) to position the surgical guide 608 about a coupling point with the base 602 such that the surgical guide 608 pivots about said coupling point. The actuator 618 is shown to include a texture about an outer edge thereof to facilitate grip when rotating the actuator 618. The osteotomy system 600 further includes a cut guide 614 coupled with (e.g., releasably, pivotably, etc.) a portion of the base 602. The cut guide 614 is shown to include an extension 612 having a slot 616 disposed therethrough (which may be open-ended at a distal portion of the extension 612), where the slot 616 has a substantially elongated geometry and is configured to receive at least a portion of a cutting instrument. Additionally, the cut guide 614 includes a protrusion 615 extending from a position that is adjacent the slot 616 and having a bore 617, where the bore 617 may be configured to receive a stabilization element (e.g., the same as and/or similar to the stabilization elements 606) to retain the cut guide 614 in a static position while one or more cuts are performed. The cut guide 614 is further shown to include an actuator 618 (the same as and/or similar to that described previously) configured to be rotated (e.g., actuated) such that rotation of the actuator 618 drives the pivoting motion of the cut guide 614 about a coupling point with the base 602.

Figure 26:
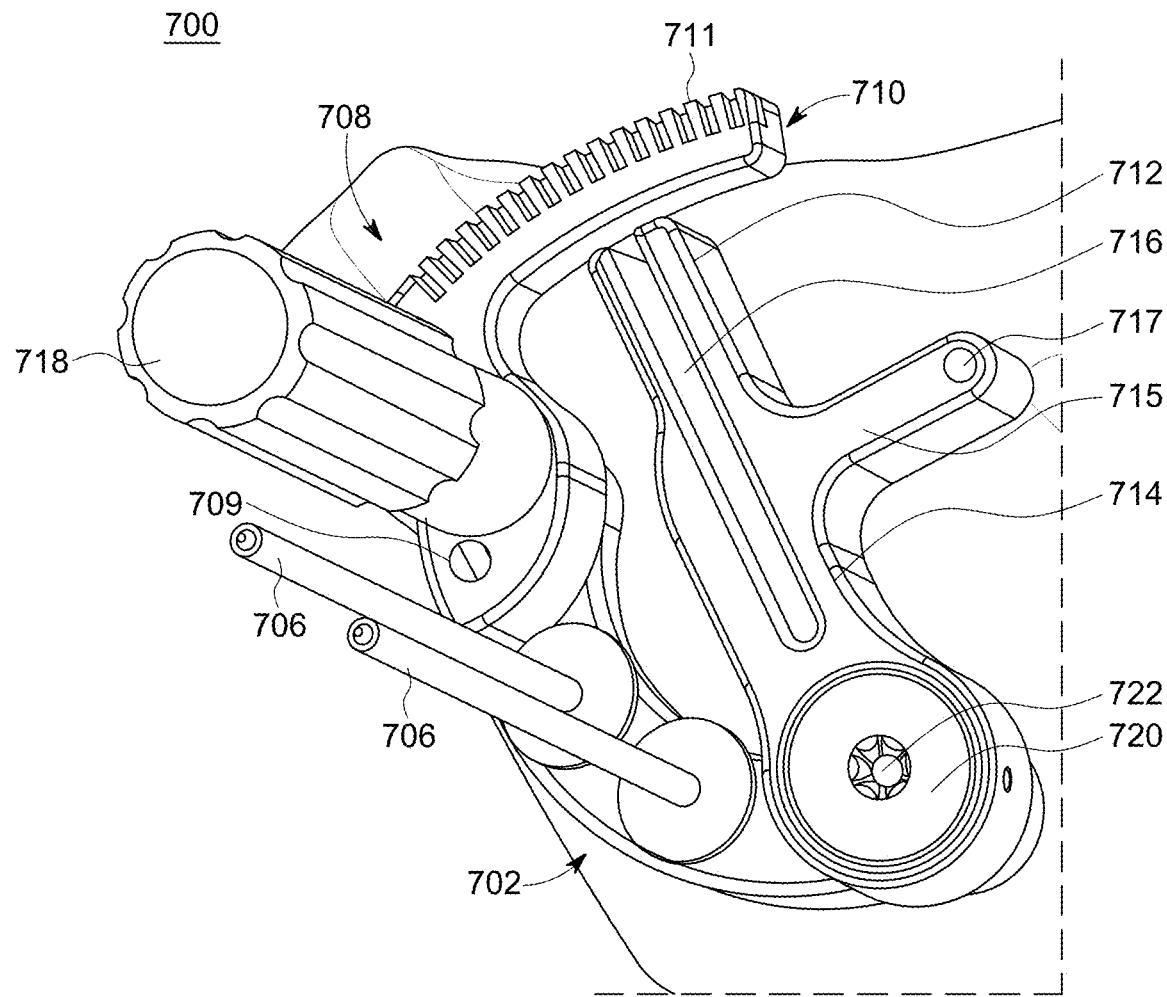
FIG. 26 is a perspective view of another alternate embodiment of an exemplary tibial osteotomy system, in accordance with an aspect of the present disclosure.

Referring now to FIG. 26, an osteotomy system 700 is shown, according to an exemplary embodiment. The osteotomy system 700 is shown to include a base 702 having a substantially semi-circular geometry (e.g., less than an entire circle), with the base 702 including bores (not shown) disposed about the base and configured to receive stabilization elements 706 therethrough so as to facilitate stabilization and the releasably coupled with one or more musculoskeletal structures. The osteotomy system 700 is further shown to include a surgical guide 708 configured to releasably couple with at least one of the stabilization elements 706 via a coupling mechanism such that the surgical guide 708 may be pivoted about the coupling mechanism. The surgical guide 708 includes an extension 710 having a substantially curved geometry, wherein the extension 710 includes protrusions 711 arranged on and extending from a side of the extension 710. In some aspects, the protrusions 711 may be positioned at intervals corresponding to angle or arc measurements when manipulated about components of the osteotomy system 700. The surgical guide 708 is shown to include an actuator 718 disposed substantially superior relative the surgical guide 708 where the actuator 718 may be manipulated (e.g., rotated) to position the surgical guide 708 about a coupling point with the base 702 such that the surgical guide 708 pivots about said coupling point. The actuator 718 is shown to include a texture about an outer edge thereof to facilitate grip when rotating the actuator 718. In some aspects, the surgical guide 708 may also include a bore 709 through which the stabilization element 706 may be positioned so as to secure the surgical guide 708 in a static position (e.g., after having been manipulated to a desired position). The osteotomy system 700 further includes a cut guide 714 coupled with (e.g., releasably, pivotably, etc.) a portion of the base 702. The cut guide 714 is shown to include an extension 712 having a slot 716 disposed therethrough (which may be open-ended at a distal portion of the extension 712), where the slot 716 has a substantially elongated geometry and is configured to receive at least a portion of a cutting instrument. Additionally, the cut guide 714 includes a protrusion 715 extending from a position adjacent to the slot 716 and having a bore 717, where the bore 717 may be configured to receive a stabilization element (e.g., the same as and/or similar to the stabilization elements 706) to retain the cut guide 714 in a static position while one or more cuts are performed. The cut guide 714 is further shown to include a coupling element 720 including an interface 722 (e.g., Torx, hex, etc.) configured to couple the cut guide 714 with a portion of the base 702 so as to facilitate pivoting of the cut guide 714 about a coupling point with the base 702.

Figure 27:
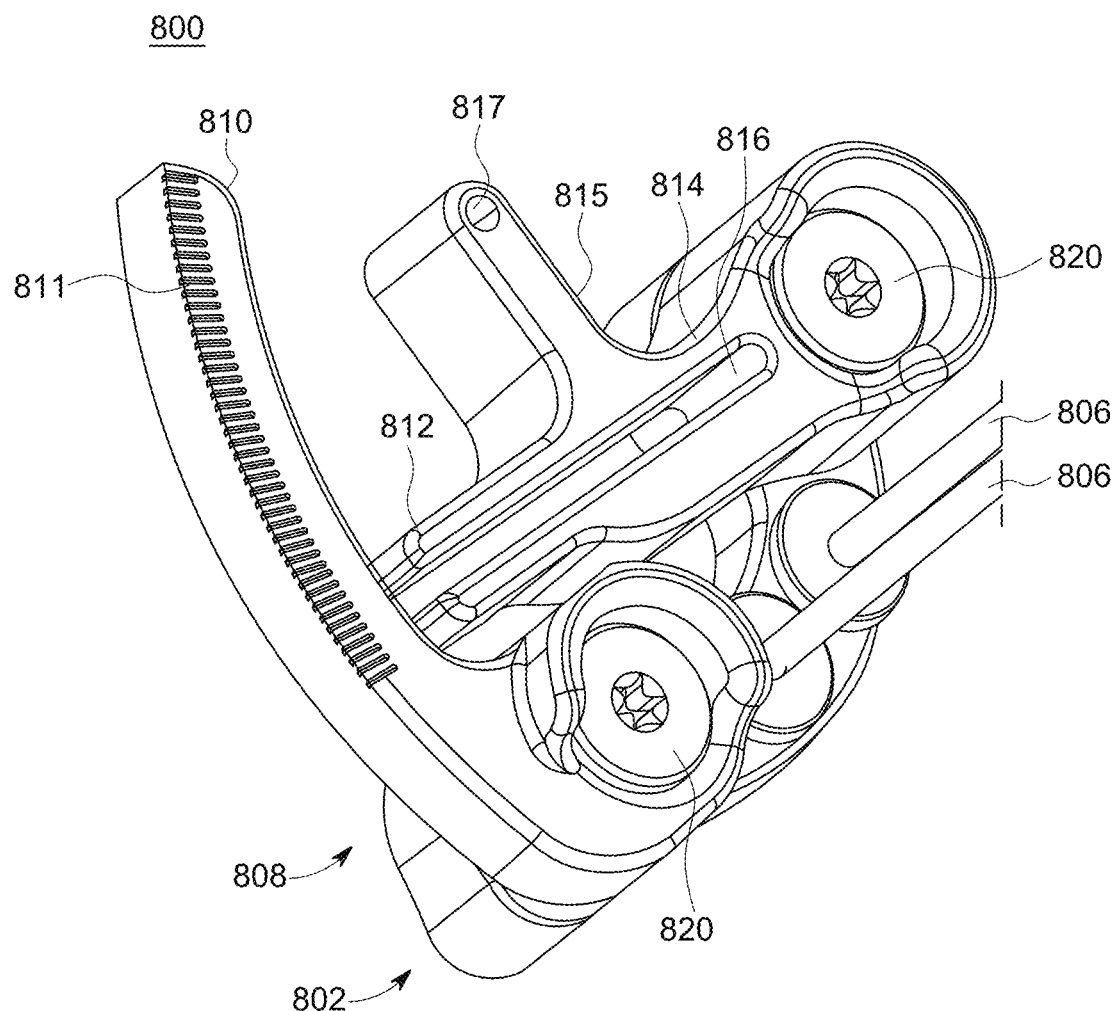
FIG. 27 is a perspective view of another alternate embodiment of an exemplary tibial osteotomy system, in accordance with an aspect of the present disclosure.

Referring now to FIG. 27, an osteotomy system 800 is shown, according to an exemplary embodiment. The osteotomy system 800 is shown to include a base 802 having a substantially semi-circular geometry (e.g., less than an entire circle), with the base 802 including bores (not shown) disposed about the base 802 and configured to receive stabilization elements 806 therethrough so as to facilitate stabilization and be releasably coupled to one or more musculoskeletal structures. The osteotomy system 800 is further shown to include a surgical guide 808 configured to releasably couple with at least one of the stabilization elements 806 via a coupling mechanism such that the surgical guide 808 may be pivoted about the coupling mechanism. The surgical guide 808 includes an extension 810 having a substantially curved geometry, wherein the extension 810 includes protrusions 811 arranged on and extending from a side of the extension 810. In some aspects, the protrusions 811 may be positioned at intervals corresponding to angle or arc measurements when manipulated about components of the osteotomy system 800. The surgical guide 808 is shown to include a coupling element 820 including an interface 822 (e.g., torx, hex, etc.) configured to couple the cut guide 814 with a portion of the base 802 so as to facilitate the pivoting of the cut guide 814 about a coupling point with the base 802. In some aspects, the surgical guide 808 may also include a bore (not shown) through which the stabilization element 806 may be positioned so as to secure the surgical guide 808 in a static position (e.g., after having been manipulated to a desired position). The osteotomy system 800 further includes a cut guide 814 coupled with (e.g., releasably, pivotably, etc.) a portion of the base 802. The cut guide 814 is shown to include an extension 812 having a slot 816 disposed therethrough (which may be open-ended at a distal portion of the extension 812), where the slot 816 has a substantially elongated geometry and is configured to receive at least a portion of a cutting instrument. Additionally, the cut guide 814 includes a protrusion 815 extending from a position adjacent to the slot 816 and having a bore 817, where the bore 817 may be configured to receive a stabilization element (e.g., the same as and/or similar to the stabilization elements 806) to retain the cut guide 814 in a static position while one or more cuts are performed. The cut guide 814 is further shown to include an additional coupling element 820 (the same and/or similar to that described previously) configured to couple the cut guide 814 with a portion of the base 802 so as to facilitate the pivoting of the cut guide 814 about a coupling point with the base 802.

The osteotomy system 100 described herein, as well as those shown in alternate embodiments (as described herein), include components configured to mount directly to the tibia and allow for one or more surgeons to measure precise angles in the sagittal plate for opening and closing wedge osteotomies. Further, the base plate 112 is configured to accommodate the metaphyseal flare of the tibia. Additionally, multiple cut guides (e.g., cut guide inserts) allow for correction in the frontal plane. The osteotomy system 100 is also configured for radiographic visualization of the osteotomy site prior to making cuts in the bone (e.g., can be radiopaque). The osteotomy system 100 can also be assembled and disassembled in order to facilitate cleaning and sanitation procedures and may be used for tibial osteotomies on right and/or left legs of patients (e.g., right and/or left tibias). In some embodiments, the osteotomy system and/or components thereof may be 3-D printed using a variety of materials (e.g., various polymers, metals, stainless steel, other metal alloys, etc.) including those with known biocompatibility.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has", and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The invention has been described with reference to the preferred embodiments. It will be understood that the architectural and operational embodiments described herein are exemplary of a plurality of possible arrangements to provide the same general features, characteristics, and general system operation. Modifications and alterations will occur to others upon a reading and understanding of the preceding detailed description. It is intended that the invention be construed as including all such modifications and alterations.

What is claimed is:

1. A tibial osteotomy system, comprising:
    a base plate comprising a first end and a second end;
    a measuring arm coupled with and extending from the first end of the base plate; and a cut guide coupled with and extending from the second end of the base plate, wherein the cut guide is translatable relative to the base plate and the measuring arm;

wherein the measuring arm is coupled with the first end of the base plate by a first screw and the cut guide is coupled with the second end of the base plate by a second screw; and wherein the first and second screws each have a bore extending through a length of the screws along a central axis, the bores being configured to receive a stabilization element.

2. The tibial osteotomy system of claim 1, wherein the measuring arm comprises a curved geometry.

3. The tibial osteotomy system of claim 2, wherein the measuring arm further comprises:
a head portion comprising an aperture configured to fixedly couple with the first end of the base plate; and
an arm portion extending from the head portion comprising a guide portion.

4. The tibial osteotomy system of claim 1, wherein the cut guide is pivotably coupled with the second end of the base plate.

5. The tibial osteotomy system of claim 4, wherein the cut guide further comprises:
a head portion comprising an aperture configured to pivotable couple with the second end of the base plate; and
a body extending from the head portion comprising a first arm and a second arm, wherein the first arm and the second arm define a slot.

6. The tibial osteotomy system of claim 5, wherein the cut guide further comprises:
a measurement flag releasably couplable with the slot such that pivoting of the cut guide relative to the measuring arm positions the measurement flag adjacent to a guide portion of the measuring arm.

7. The tibial osteotomy system of claim 5, wherein the slot is configured to accommodate a blade of a cutting tool.

8. The tibial osteotomy system of claim 5, wherein the cut guide further comprises:
a protrusion extending from the body of the cut guide and having at least one aperture, wherein the aperture of the protrusion is configured to receive a stabilization element.

9. The tibial osteotomy system of claim 1, wherein the base plate comprises a body portion disposed between the first end and the second end, wherein a bottom surface of the base plate is configured to interface with an anterior surface of a tibia.

10. The tibial osteotomy system of claim 9, wherein a body portion of the base plate comprises a pair of apertures configured to receive a pair of stabilization elements, wherein the stabilization elements couple the base plate to the tibia.

11. The tibial osteotomy system of claim 1, wherein the first and second screws are configured the same.

12. A tibial osteotomy system, comprising:
a base plate configured to interface with a tibia, wherein the base plate comprises:
a body comprising a first pair of apertures configured to receive a first pair of stabilization elements;
a first end comprising a first aperture; and
a second end comprising a second aperture, wherein the first end is opposite the second end;
a measuring arm fixedly coupled to the first end of the base plate via the first aperture and further comprising a third aperture, wherein the third aperture and the first aperture align to receive a first screw therein; and
a cut guide pivotably coupled with the second end of the base plate via the second aperture and a fourth aperture, the fourth aperture and second aperture are aligned to receive a second screw therein, wherein the cut guide further comprises:
a slot;
a measurement flag releasably couplable within the slot; and
a protrusion comprising a fifth aperture, wherein the fifth aperture is configured to receive a second stabilization element therethrough.

13. The tibial osteotomy system of claim 12, wherein the first screw and the second screw each comprise a bore configured concentrically about a central axis, the bores configured to receive a second pair of stabilization elements.

14. The tibial osteotomy system of claim 13, wherein the second pair of stabilization elements are K-wires.

15. The tibial osteotomy system of claim 12, wherein the first pair of stabilization elements are olive wires.

16. The tibial osteotomy system of claim 12, wherein the measuring arm comprises a guide portion, the guide portion comprising incremental measurement markings.

17. The tibial osteotomy system of claim 12, wherein a measurement flag is coupled within the slot such that pivoting the cut guide positions the measurement flag adjacent the incremental measurement markings.

18. A method of preparing a tibia for a tibial osteotomy, the method comprising:
providing a tibial osteotomy system, the system comprising:
a base plate;
a measuring arm fixedly coupled with the base plate; and
a cut guide pivotably coupled with the base plate and comprising a measurement flag releasably coupled within a slot;
coupling the base plate with the tibia;
pivoting the cut guide such that the measurement flag of the cut guide is positioned adjacent the measuring arm;
removing the measurement flag from the slot; and
positioning a cutting tool such that a blade of the cutting tool is disposed within the slot of the cut guide and adjacent the tibia.

* * * * *